(12) United States Patent
Hanzawa et al.

(10) Patent No.: US 7,125,271 B2
(45) Date of Patent: Oct. 24, 2006

(54) STORAGE MEDIUM CONVEY APPARATUS AND CONVEY METHOD WITH EJECTION APPARATUS

(75) Inventors: Hisashi Hanzawa, deceased, late of Tokyo (JP); by Kazuko Hanzawa, legal representative, Tokyo (JP); Taizo Ogawa, Kanagawa (JP)

(73) Assignee: Sony Corporation(JP)

( * ) Notice: Subject to any disclaimer, the term of this patent is extended or adjusted under 35 U.S.C. 154(b) by 12 days.

(21) Appl. No.: 10/399,003

(22) PCT Filed: Aug. 16, 2002

(86) PCT No.: PCT/JP02/08327

§ 371 (c)(1),
(2), (4) Date: Oct. 15, 2004

(87) PCT Pub. No.: WO03/017190

PCT Pub. Date: Feb. 27, 2003

(65) Prior Publication Data

US 2005/0070142 A1    Mar. 31, 2005

(30) Foreign Application Priority Data

Aug. 21, 2001 (JP) ............................. 2001-250904

(51) Int. Cl.
*H01R 13/62* (2006.01)

(52) U.S. Cl. .................................................. 439/159

(58) Field of Classification Search ................ 439/159, 439/160, 158, 157
See application file for complete search history.

(56) References Cited

U.S. PATENT DOCUMENTS

| | | | |
|---|---|---|---|
| 5,597,316 A * | 1/1997 | David et al. ................. | 439/159 |
| 5,655,918 A * | 8/1997 | Soh ............................. | 439/159 |
| 6,010,344 A * | 1/2000 | Muramatsu et al. ........ | 439/159 |
| 6,319,029 B1* | 11/2001 | Nishioka ..................... | 439/159 |
| 6,643,125 B1* | 11/2003 | Nabetani et al. ............ | 361/684 |
| 2004/0067668 A1* | 4/2004 | Hirata et al. ................ | 439/159 |

* cited by examiner

*Primary Examiner*—Phuong Dinh
(74) *Attorney, Agent, or Firm*—Lerner, David, Littenberg, Krumholz & Mentlik, LLP

(57) ABSTRACT

Apparatus that carries or transfers a memory medium having a solid-state memory over the inside and outside portions of a recording and/or reproducing apparatus is adapted so that, by selective engagement with respect to a chassis or a holder of a fluctuation lever the memory medium is inserted and held. The memory medium is moved in a manner bridging between an eject position where insertion/withdrawal of the memory medium is permitted and a loading position. A first biasing member moves and biases the holder in an eject direction opposite to a memory medium insertion direction is caused to store biasing force in the eject direction. A second biasing member biases the holder in the memory medium insertion direction and is caused to be operative to carry out switching between movement in the memory medium insertion direction of the holder and movement in the eject direction.

13 Claims, 19 Drawing Sheets

STORAGE MEDIUM CONVEY APPARATUS AND CONVEY METHOD WITH EJECTION APPARATUS

TECHNICAL FIELD

The present invention relates to a carrying apparatus and a carrying method for a memory medium which are adapted for carrying a memory medium using a solid-state memory as a memory element to, e.g., loading position within a recording and/or reproducing apparatus, and further relates to a recording and/or reproducing apparatus using such a carrying apparatus.

BACKGROUND ART

Hitherto, memory medium using a solid-state memory as a memory element is used as a memory medium for information signal. Since the memory medium using the solid-state memory can be formed compact while ensuring large memory capacity, further miniaturization of the recording and/or reproducing apparatus using such memory medium can be realized.

DISCLOSURE OF THE INVENTION

An aspect of the invention is to realize further miniaturization of a carrying apparatus for a memory medium using a solid-state memory as a memory element which can be formed compact while ensuring large memory capacity, and to realize further miniaturization of a recording and/or reproducing apparatus using such a carrying apparatus.

In another aspect of the invention, a carrying apparatus and a carrying method is provided which can securely carry a memory medium using a solid-state memory as a memory element to the inside and outside of the apparatus.

A further aspect of the invention is to provide a carrying apparatus and a recording and/or reproducing apparatus provided with an eject mechanism which can securely eject a memory medium which has been carried to a predetermined loading position.

A carrying apparatus for a memory medium according to another aspect of the invention includes a holder adapted so that the memory medium is inserted and provided with a connection terminal connected to a contact provided at the front side of the inserted memory medium. A lock mechanism may be provided at the holder and locked with respect to a chassis adapted so that the holder is movably supported. The lock mechanism serving to limit movement with respect to the chassis of the holder, and being such that when the contact of the memory medium inserted into the holder is connected to the connection terminal of the holder, the lock mechanism is pressed by the memory medium to thereby release the lock with respect to the chassis. A fluctuation lever engaged with the holder moved as the result of the fact that the lock is released with respect to the chassis by the lock mechanism, and moved in an insertion direction of the memory medium in one body with the holder. The apparatus also includes a first biasing-portion for biasing the fluctuation lever in an eject direction opposite to the insertion direction of the memory medium, and a second biasing-portion for biasing the holder in the insertion direction of the memory medium of the holder. In this carrying apparatus, the fluctuation lever is moved in the insertion direction of the memory medium in one body with the holder to thereby allow the first biasing means to store biasing force which moves the fluctuation lever in the ejection direction, and engagement with respect to the holder is released by movement in the insertion direction of the memory medium of the fluctuation lever and only the holder into which the memory medium is inserted is drawn or pulled in the insertion direction of the memory medium by the second biasing means in accordance with engagement with respect to the chassis.

Here, the fluctuation lever is rotationally biased by the first biasing-portion in the direction where engagement with respect to the holder is released. Moreover, the fluctuation lever is adapted so that when it is moved in the insertion direction of the memory medium in one body with the holder, release of engagement with respect to the holder is limited by a rotation limiting portion provided at the side of a chassis which movably supports the holder.

The lock mechanism used in the carrying apparatus according to another aspect of the invention includes a pressing operation portion which is caused to undergo pressing operation by a lock piece engaged with the chassis and the memory medium inserted into the holder. The portion includes a lock lever rotatably supported by the holder and rotationally biased by a biasing member in a direction to engage the lock piece with the chassis.

The chassis of the carrying apparatus includes, a cover body which opens or closes a memory medium insertion/withdrawal opening adapted so that the memory medium to be inserted into the holder is inserted thereinto or withdrawn therefrom is rotatably attached. The cover body is rotationally biased by the biasing member in—a direction to close the memory medium insertion/withdrawal opening at all times.

The carrying apparatus according to another aspect of the invention further includes a slider movably supported by the chassis in the insertion direction with respect to the holder of the memory medium, and adapted so that the fluctuation lever is rotatably supported. Here, the first biasing portion comprises a first biasing member which is provided in a manner bridging between the slider and the chassis, and biases the slider in the eject direction opposite to the insertion direction of the memory medium. The second biasing portion comprises a second biasing member which is provided in a manner bridging between the slider and the holder, and biases the holder in the insertion direction of the memory medium. The fluctuation lever is adapted so that lock with respect to the chassis by the lock mechanism is released so that it is moved in the insertion direction of the memory medium in one body with the holder moved in the insertion direction of the memory medium to thereby allow the first biasing member to store biasing force which moves the slider in the eject direction. It is also adapted so that when a fluctuation lever lock mechanism provided at the fluctuation lever is moved up to the position opposite to a cut portion provided at the chassis side, the fluctuation lever lock mechanism is inserted into the cut portion and engagement between the engagement portion and the holder is released by rotational force produced as the result of the fact that force in the insertion direction of the memory medium by the holder and biasing force in the eject direction by the first biasing member with respect to the fluctuation lever act with respect to an engagement portion of the fluctuation lever formed at the position engaged with the holder, and the fluctuation lever and the slider are locked with respect to the chassis and only the holder inserted into the memory medium is drawn or pulled in the insertion direction of the memory medium by biasing force of the second biasing member.

The carrying apparatus according to another aspect of the invention further includes an eject operation portion for allowing the holder moved in the insertion direction of the memory medium by the second biasing portion to undergo-movement operation in the eject direction against biasing force of the second biasing portion, whereby when only the holder to be inserted into the memory medium is drawn or pulled in the insertion direction of the memory medium by the second biasing portion and is held at a loading position of the memory medium, the holder is moved in the eject direction against biasing force of the second biasing portion through the eject operation means to thereby release engagement with respect to the chassis of the fluctuation lever to receive biasing force of the first biasing means to move the holder in the eject direction in one body with the fluctuation lever to move the holder up to the initial position. Here, the eject operation portion comprises an eject operation piece moved in one body with the holder.

The carrying apparatus according to another aspect of the invention further includes a slider movably supported by the chassis in the insertion direction with respect to the holder of the memory median, and adapted so that the fluctuation lever is rotatably supported. The first biasing portion constituting this apparatus includes a first biasing member which is provided in a manner bridging between the slider and the chassis, and biases the slider in an eject direction opposite to the insertion direction of the memory medium, and the second biasing portion comprises a second biasing member which is provided in a manner bridging between-the slider and the holder, and biases the-holder in the insertion direction of the memory medium. The fluctuation lever is adapted so that lock with respect to the chassis by the lock mechanism is released so that it is moved into the insertion direction of the memory medium in one body with the holder moved in the insertion direction of the memory medium to thereby allow the first biasing member to store biasing force which moves the slider in the eject direction, whereby when a fluctuation lever lock mechanism provided at the fluctuation lever is moved up to the position opposite to a cut portion provided at the chassis side, the fluctuation lever lock mechanism is inserted into the cut portion and engagement between the engagement portion and the holder is released by rotational force produced as the result of the fact that force in the insertion direction of the memory medium by the holder and biasing force in the eject direction by the first biasing member with respect to the fluctuation lever act with respect to engagement portion of the fluctuation lever formed at the position engaged with the holder, and the fluctuation lever and the slider are locked with respect to the chassis and only the holder into which the memory medium is inserted is drawn or pulled in the insertion direction of the memory-medium by biasing force of the second biasing member so that it is held at loading position of the memory medium to move the holder in eject direction against biasing force of the second biasing member through eject operation portion, and to rotate the fluctuation lever by biasing force by the first biasing portion to release lock with respect to the chassis by the fluctuation lever lock mechanism to receive biasing force of the first biasing member to move the holder in the eject direction in one-body with the fluctuation lever to move the holder to initial position.

A recording and/or reproducing apparatus according to the present invention including a holder adapted so that a memory medium is inserted, and provided with a connection terminal connected to a contact provided at the front side of the inserted memory medium, recording and/or reproducing means for carrying out recording and/or reproduction of data with respect to the memory medium of which contact is connected to the connection terminal of the holder, a lock mechanism provided at the holder and locked by a chassis adapted so that the holder is movably supported, and the lock mechanism serving to limit movement with respect to the chassis of the holder and being such that when the contact of the memory medium inserted into the holder is connected to the connection terminal of the holder, the lock mechanism is pressed by the memory medium to thereby release lock with respect to the chassis, a fluctuation lever engaged with the holder moved as the result of the fact that lock with respect to the chassis by the lock mechanism is released and moved in insertion direction of the memory medium in one body with the holder, first biasing portion for biasing the fluctuation lever in an eject direction opposite to the insertion direction of the memory medium, and second biasing portion for biasing the holder in the insertion direction of the memory medium. In this recording and/or reproducing apparatus, the fluctuation lever is moved in the insertion direction of the memory medium in one body with the holder to thereby allow the first biasing portion to store biasing force which moves the fluctuation lever in the eject direction, and engagement with respect to the holder is released by movement in the insertion direction of the memory medium of the fluctuation lever and only the holder into which the memory medium is inserted is drawn or pulled in the insertion direction of the memory medium by the second biasing portion in accordance with engagement with respect to the chassis.

Another aspect of invention is directed to a method of carrying a memory medium including the steps of: inserting a memory medium into a holder, electrically connecting a contact of the memory medium and a connection terminal within the holder, pressing, by the memory medium, lock portion which locks the holder at a chassis after the contact of the memory medium and the connection terminal within the holder are electrically connected to thereby release lock by the lock means, further moving the holder along with the memory medium in an insertion direction, engaging a lever moved in the insertion direction in one body with the holder as the result of the fact that the lever is engaged with the holder with the chassis and of releasing engagement with the holder, storing biasing force in an eject direction opposite to the insertion direction at first biasing portion for a time period during which the lever is moved with the holder is moved in the insertion direction where engagement with the holder is released, and drawing or pulling only the holder in which engagement by the lever has been released in the insertion direction along with the memory medium by second biasing portion.

This method of carrying out memory medium further includes drawing or pulling only the holder in which engagement by the lever has been released in the insertion direction along with the memory medium by the second biasing portion to hold it at a loading position, and moving the holder held at the loading position to move it in the eject direction against biasing force of the second biasing portion to thereby release engagement with respect to the chassis of a fluctuation lever to receive biasing force of the first biasing means to move the holder in one body with the fluctuation lever in the eject direction to move the holder to initial position.

Still further aspects of the present invention and practical merits obtained by the present invention will become more apparent from the description of the embodiments which will be given below with reference to the attached drawings.

BEST MODE FOR CARRYING OUT THE INVENTION

Figure 1:
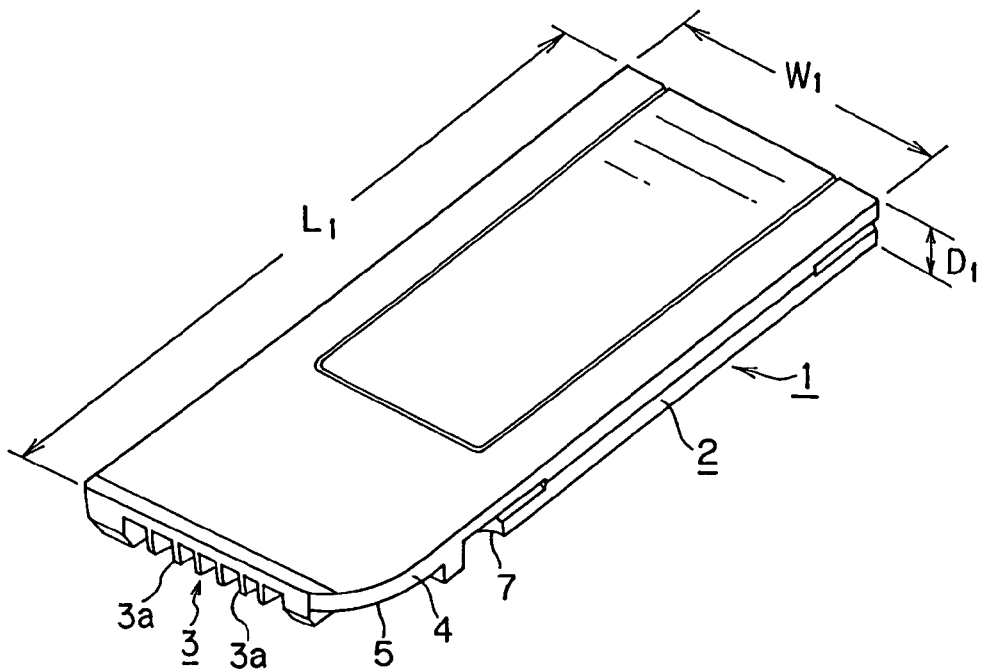
FIG. 1 is a perspective view showing plane side of a memory medium used in the present invention.

First, a memory medium used in a recording and/or reproducing apparatus to which a carrying apparatus for memory medium according to the present invention is applied will be explained. This memory medium 1 uses solid state memory as a memory element, and comprises a casing 2 constituting the memory body obtained by molding synthetic resin. Within this casing 2, memory element such as flash memory, etc. having, e.g., large memory capacity of 32 mega byte or more is provided. As shown in FIG. 1, the memory medium 1 is formed so as to take substantially rectangular shape in which, e.g., length $W_1$ of the short side is caused to be substantially 21.45 mm, length $L_1$ of the long side is caused to be substantially 50 mm, and thickness $D_1$ is caused to be substantially 2.8 mm.

Figure 2:
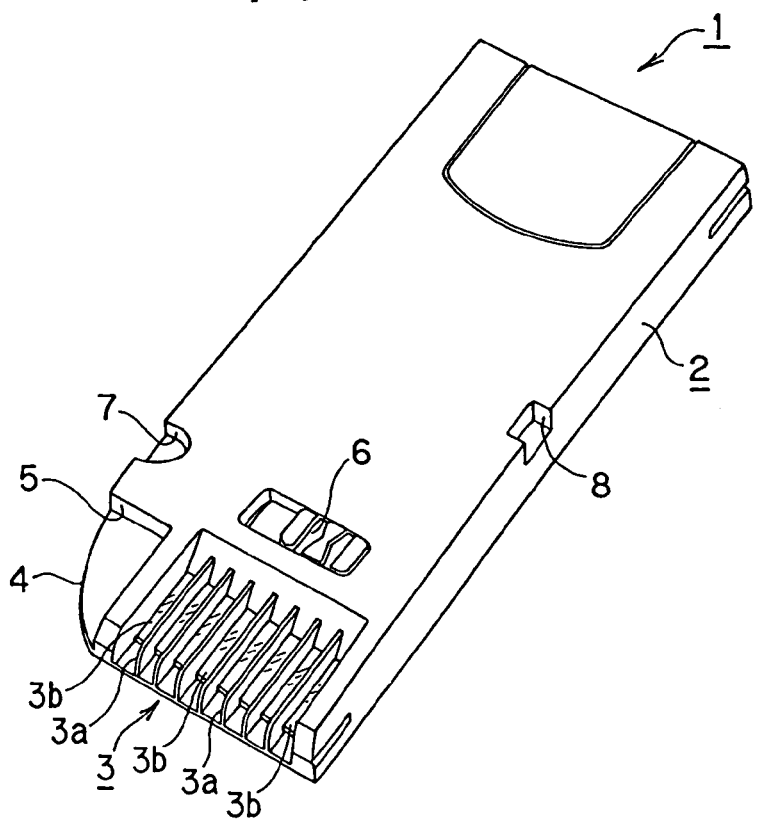
FIG. 2 is a perspective view showing bottom face side of the memory medium shown in FIG. 1.

As shown in FIGS. 1 and 2, at one end side serving as the side of one short side of the casing 2 constituting the memory medium 1, there is formed a contact portion 3 in a manner bridging over the bottom face from one end surface. At this contact portion 3, there are provided plural contacts 3b separated by partitioning walls 3a from each other. Read or write operation of information with respect to the memory element provided within the casing 2 is carried out through the contacts 3b provided at the contact portion 3.

As shown in FIGS. 1 and 2, at one corner portion of one end surface side where the contact portion 3 is formed of the casing 2, there is provided a cut portion 4, which is cut so as to take circular arc shape, indicating insertion direction into recording and/or reproducing apparatus. As shown in FIG. 2, at one side surface of the side where the cut portion 4 is formed of the casing 2, an erroneous insertion preventing groove 5 where the bottom face side of the casing 2 is opened is formed in a manner continuous to the cut portion 4. The cut portion 4 and the erroneous insertion preventing groove 5 serve to limit insertion direction with respect to the recording and/or reproducing apparatus to prevent erroneous insertion when the plate shaped memory 1 is loaded with respect to the recording and/or reproducing apparatus.

At the bottom face side of the casing 2, an erroneous recording prevention switch 6 which prevents that information signal is erroneously recorded with respect to semiconductor memory is provided in the state positioned in the vicinity of the contact portion 3. The erroneous recording prevention switch 6 is connected to operation element within the casing 2 and is adapted so that when it is slid to one side, recording of information signal is permitted, while when it is slid to the other side, it is inhibited that new information signal is overwritten. At one side surface and the other side surface of the casing 2, there are provided a first engagement recessed portion 7 which is engaged with engagement holding portion provided at the recording and/or reproducing apparatus side and a second engagement recessed portion 8 with which detecting portion which detects presence or absence of loading is engaged when the memory medium 1 is inserted into the recording and or reproducing apparatus.

Figure 3:
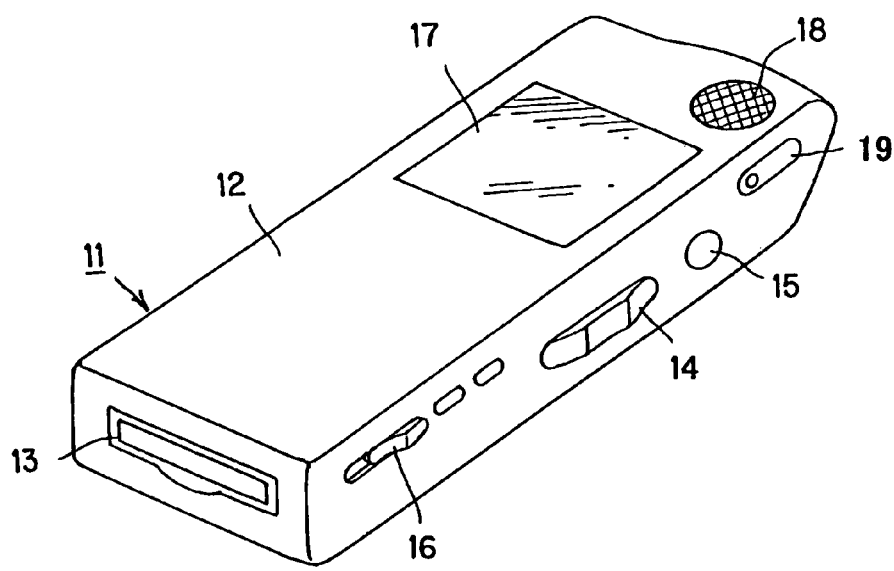
FIG. 3 is a perspective view showing an example of a recording/reproducing apparatus to which the present invention is applied.

As a recording/reproducing apparatus to which the present invention is applied using the memory medium 1 constituted as described above, there is a recording/reproducing apparatus constituted as shown in FIG. 3. The recording/reproducing apparatus shown in FIG. 3 serves to record information signal such as audio data, etc. With respect to the recording medium 1, or to carry out reproduction of information signal such as audio data, etc. Stored in the memory medium 1. This recording/reproducing apparatus 11 is caused to be of configuration of a size to such a degree that it is used in the state grasped by hand, and comprises, as shown in FIG. 3, a housing 12 constituting the apparatus body formed so as to take elongated rectangular parallelepiped shape. Within the housing 12, there is included a loading unit for the memory medium 1 to which carrying apparatus according to the present invention constituted as described later is applied. Loading of the memory medium 1 is carried out through this loading unit. At the bottom face of the housing 12, there is provided a memory median insertion/withdrawal opening 13 for inserting/withdrawing the memory medium 1 with respect to the loading unit included within the housing 12. The memory medium insertion/withdrawal opening 13 is formed so as to take rectangular shape having dimensions sufficient so that the memory medium 1 is inserted with one end side where the contact portion 3 is provided being as insertion end. The memory medium insertion/withdrawal opening 13 is closed by cover body rotatably supported at the loading unit side.

Within the housing 12, there are provided a recording/reproducing circuit for carrying out recording of information signal such as audio data, etc. With respect to the loaded memory medium 1, or carrying out reproduction of information signal such as audio data, etc. Stored with respect to the memory medium 1, and other signal processing units. As shown in FIG. 3, at one side surface of the housing 12, there are provided a recording mode select key 19 for selecting recording mode for carrying out recording of information signal such as audio data, etc. With respect to the recording medium 1, a reproduction (playback) mode select key 14, a stop key 15 for stopping operation mode such as recording mode, etc., and a various kind operation key 16 for carrying out selection of other operation modes. Moreover, at the position of the upper side of the front side of the housing 12, there is provided a display unit 17 comprised of liquid crystal device, etc. On this display unit 17, current operation mode and/or index of information recorded with respect to the recording medium, etc. are displayed. At the corner portion of the upper side of the front side where this display unit 17 is provided, there is provided a microphone 18 for carrying out collection of external sound.

Moreover, although not shown, at the housing 12, there is provided a connection unit for realizing connection to personal computer or disc drive unit through connection cord. This connection unit is constituted as unit caused to be in conformity with USB (Universal Serial Bus).

In the recording/reproducing apparatus having such a configuration, the memory medium 1 as shown in FIGS. 1 and 2 is loaded at loading position within the apparatus body through the memory medium insertion/withdrawal opening 13 to operate the recording mode select key 19 so that there results recording operation mode, whereby recording of audio data inputted from external equipment such as personal computer, etc. through the connection unit and or sound (voice) collected through the microphone 18 is carried out. In addition, the reproduction (playback) mode select key 14 is operated so that there results reproduction (playback) operation mode, whereby reproduction of information signal such as audio data, etc. recorded with respect to the loaded memory medium 1 is carried out.

As another example of the recording/reproducing apparatus to which the present invention is applied, there is a recording/reproducing apparatus 21 within which optical disc drive using optical disc such as Compact Disc (CD), etc. as memory medium or hard disc drive using magnetic disc as recording medium is integrally included.

Figure 4:
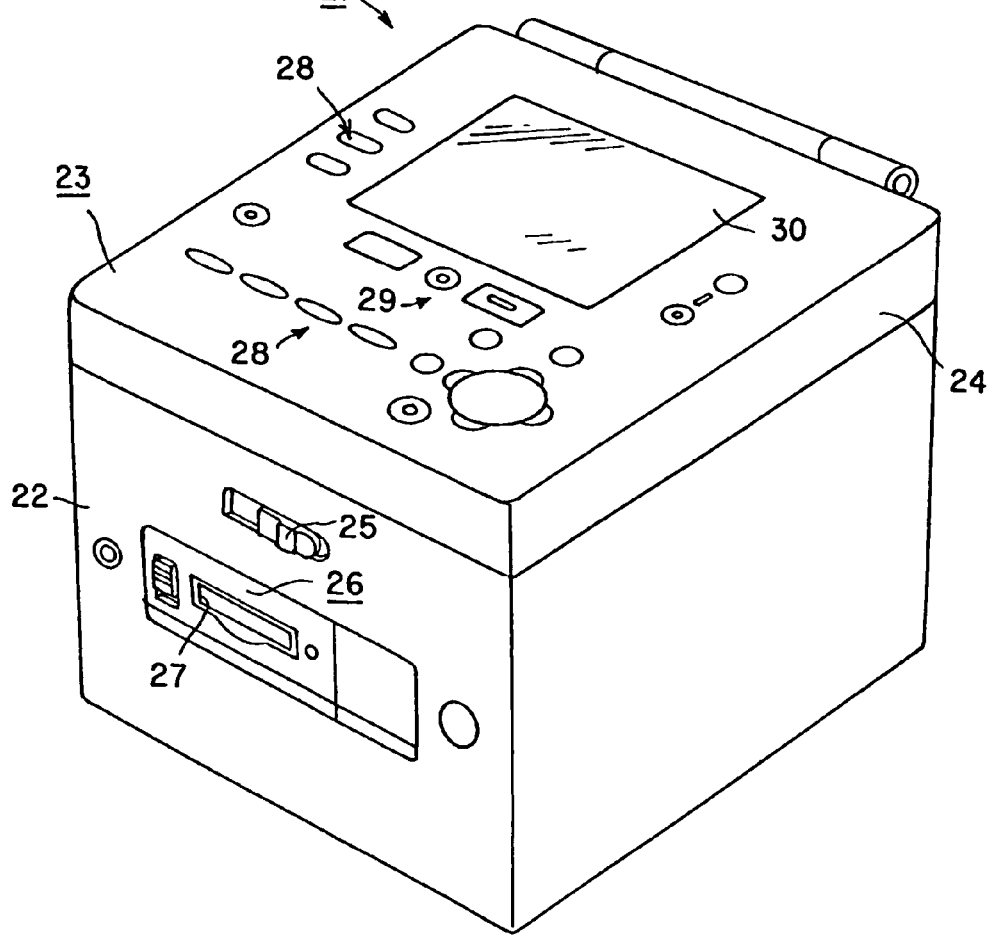
FIG. 4 is a perspective view showing another example of the recording/reproducing apparatus to which the present invention is applied.

In this recording/reproducing apparatus 21, as shown in FIG. 4, at the upper portion side of a housing 22 constituting the equipment body, there is provided an optical disc drive 23 using optical disc as recording medium. The optical disc used as a recording medium of the optical disc drive 23 is detachably loaded to the rotational drive mechanism of the optical disc drive. Attachment/detachment of optical disc with respect to the optical disc drive 23 is carried out by rotationally operating a cover body 24 provided at the upper portion of the housing 22 to thereby open the upper portion of the housing 22 to allow the disc rotational drive mechanism of the optical disc drive 23 to be faced to the external.

The opening operation of the cover body 24 is carried out by carrying out slide operation of an opening operation button 25 provided at the central portion of the front side of the housing 22.

Since the hard disc drive in which magnetic disc is integrally attached does not require exchange of magnetic disc, it is included within the housing 22.

In the recording/reproducing apparatus 21 shown in FIG. 4, a memory medium loading portion 26 adapted so that the memory medium 1 shown in FIGS. 1 and 2 is detachably loaded is further provided within the housing 22. Loading operation of the memory medium 1 with respect to the memory medium loading portion 26 is carried out by using loading unit constituted as described later to which the present invention is applied, which is included within the housing 22.

As shown in FIG. 4, insertion/withdrawal of the memory medium 1 with respect to the loading unit is carried out through a memory medium insertion/withdrawal opening 27 provided at the front central portion of the housing 22. This memory medium insertion/withdrawal opening 27 is also formed so as to take rectangular shape having dimensions sufficient so that the memory medium 1 is inserted with one end side where the contact portion 3 is provided being as insertion end as in the case of the previously described portable recording/reproducing apparatus 11, and is closed by cover body rotatably supported at the loading unit side.

Also in this recording/reproducing apparatus 21, within the housing 22, there are provided a recording/reproducing circuit for carrying out recording of information signal such as audio data, etc. With respect to the loaded memory medium 1, or for carrying out reproduction of information signal such as audio data, etc stored in the memory medium 1, and other signal processing units.

As shown in FIG. 4, at the upper surface of the cover body 24 of the apparatus body side provided at the upper portion of the housing 22, there are provided plural mode select keys 28 for selecting operation modes of the optical disc drive 23 and the hard disc drive.

The compound type recording/reproducing apparatus 21 in which the memory medium loading portion 26 is provided along with the optical disc drive 23 and the hard disc drive to permit recording/reproduction of information signal with respect to the memory medium 1 is caused to be of the configuration so as to mutually permit transmission of information signals between the optical disc drive 23, the hard disc drive and the memory medium recording/reproducing unit, and to record, e.g., audio data stored on optical disc with respect to hard disc or the memory medium 1, and has function to record audio data, etc. recorded on optical disc with respect to the memory medium 1, or to record audio data, etc. recorded on hard disc with respect to the memory medium 1, and to record audio data, etc. recorded at the memory medium 1 onto hard disc.

Transmission of information signals is mutually carried out between the optical disc, the hard disc and the memory medium 1 as stated above, and recording of information signals such as audio data, etc. between respective recording media is executed by operation of a recording mode selecting unit 29 comprised of plural operation keys provided at the upper surface of the cover body 24.

At the upper surface of the cover body 24, a display unit 30 comprised of liquid crystal device, etc. is provided similarly to the portable recording/reproducing apparatus 11. On this display unit 30, current operation mode and/or index of information recorded with respect to the recording medium 1, etc. are displayed.

Figure 5:
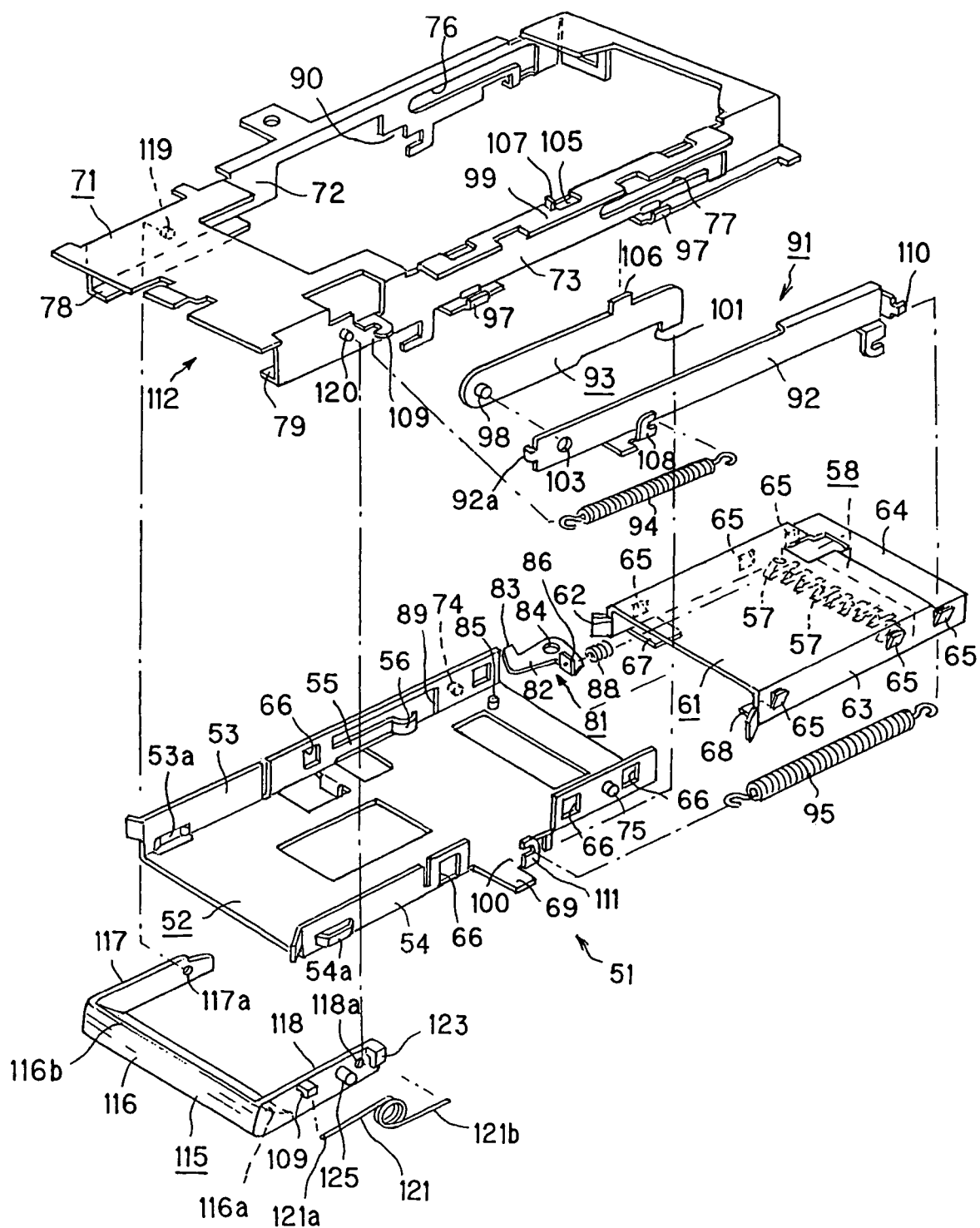
FIG. 5 is an exploded perspective view showing loading unit to which carrying apparatus according to the present invention is applied.

As shown in FIG. 5, a loading unit 51 used for loading the memory medium 1 with respect to the memory medium loading portion within the recording/reproducing apparatus 11 or 12 as described above comprises a holder 52 adapted so that the memory medium 1 loaded at the recording/ reproducing apparatus 11 or 21 is inserted and held. The holder 52 is formed by punching and bending thin metallic plate. The holder 52 has a width sufficient so that the memory medium 1 is inserted with one end side where the contact portion 3 is provided being as insertion end, and is adapted so that a pair of side walls 53, 54 which support both sides of the memory medium 1 inserted into both sides opposite to each other are formed in a projected manner, and one end side is caused to be insertion side of the memory medium 1. At one side wall 53, there is provided an engagement holding piece 55 engaged with the first engagement recessed portion 7 provided at the memory medium 1 inserted into the holder 52. The engagement holding piece 55 is formed by cutting and raising a portion of one side wall 53, and is adapted so that the base end portion side is caused to be connecting portion to the side wall 53, the engagement holding piece 55 is extended toward insertion direction of the memory medium 1, and an engagement portion 56 engaged with the first engagement recessed portion 7 of the memory medium 1 is provided at the front portion. The engagement portion 56 is formed by bending the front end portion of the engagement holding piece 55 so as to take circular arc shape, and is swelled toward the insertion side of the memory medium 1 of the holder 52.

Figure 6:
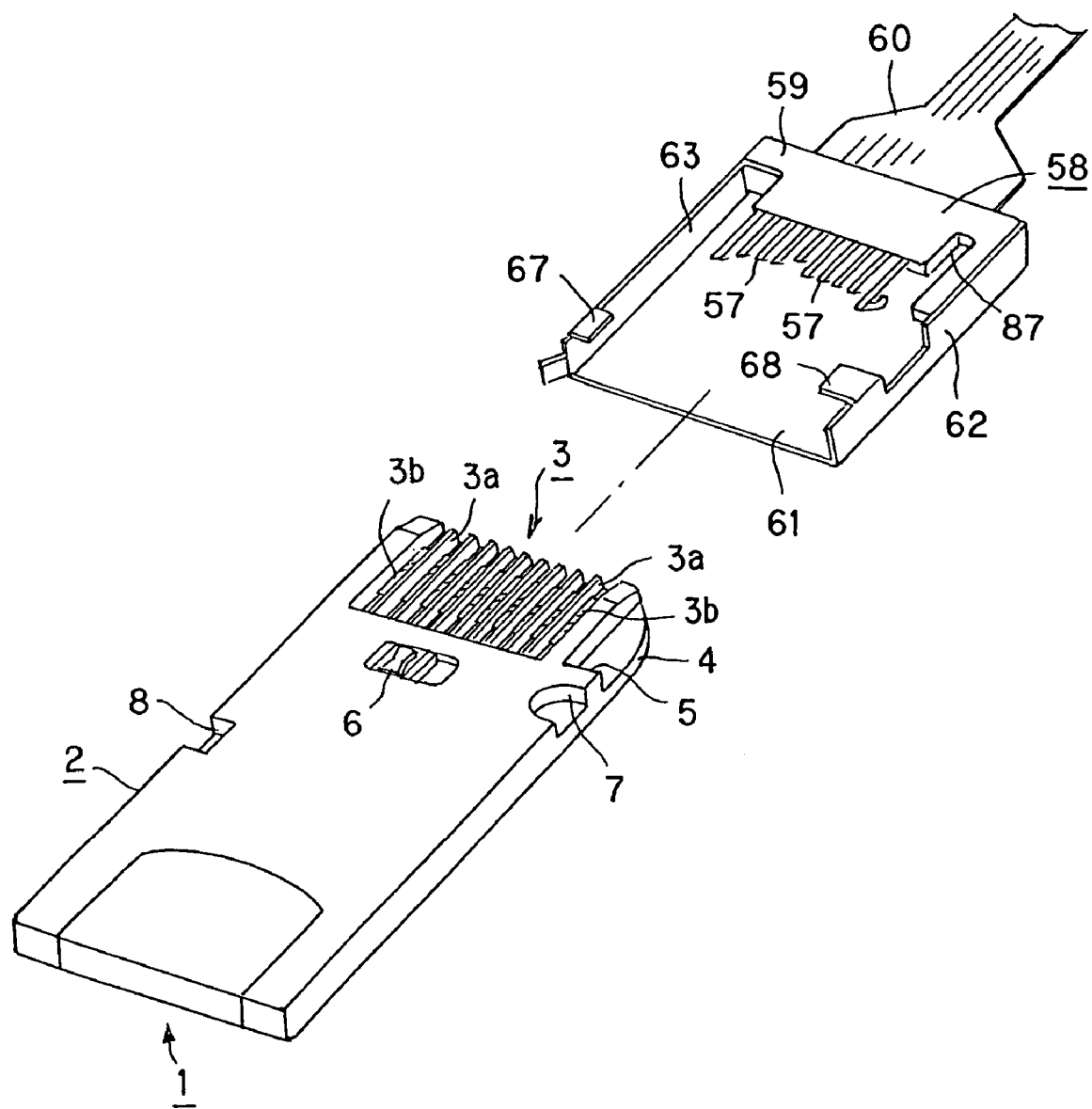
FIG. 6 is a bottom view showing connector to which memory medium is connected along with the memory medium.

At the other end side of the holder 52, there is disposed a connector 58 provided with plural connection terminals 57 to which respective contacts 3b of the contact portion 3 provided at one end side of the memory medium 1 inserted into the holder 52 are respectively electrically and mechanically connected. As shown in FIG. 6, the connector 58 is adapted so that plural connection terminals 57 are supported in parallel at a terminal supporting body 59 consisting of synthetic resin serving as insulating body, and a flexible printed board 60 for external connection is connected to the other end side of the terminal supporting body 59.

The connector 58 is attached to a connector case 61 formed so as to take channel shape in cross section by punching and bending thin metallic plate, and is attached to the other side of the holder 52 through the connector case 61. The connector case 61 is adapted so that a pair of side walls 62,63 which realize supporting of the connector 58 and serve as attachment piece with respect to the holder 52 are formed in a projected manner at both sides opposite to each other, and a rising wall 64 which limits attachment position of the connector 58 is formed at the rear side. The connector 58 is adapted so that both ends of the terminal supporting body 59 are put by the pair of side walls 62, 63 therebetween to collide the rear side of the terminal supporting body 59 with the rising wall 64 so that attachment position is caused to undergo positional limitation. Thus, the connector 58 is supported by the connector case 61. At this time, in order to prevent falling off from the connector case 61, the connector 58 is attached in the state where engagement recessed portions provided at both ends of the terminal supporting body 59 are engaged with engagement projections formed by swelling a portion of the side walls 62, 63.

As shown in FIG. 5, the connector case 61 which has attached the connector 58 is attached in such a manner that the connector 58 side is opposed to the holder 52, and the pair of side walls 62,63 are fitted into the portion between the pair of side walls 53, 54. At this time, the connector case 61 is integrally attached to the holder 52 by respectively fitting plural engagement pieces 65 formed by cutting and raising a portion of the side walls 62, 63 into plural engagement holes 66 bored at the side walls 53, 54 of the holder 52 side.

The connector case 61 is attached to the holder 52 to realize function to hold the memory medium 1 along with the holder 52. Namely, at the front end side of the side walls 62, 63, L-shaped memory medium supporting pieces 67, 68 which support the bottom face side of the memory medium 1 inserted into the holder 52 are formed in such a manner that they are bent.

As described above, by combining the connector case 61 to which the connector 58 has been attached with the holder 52, a storage holding unit for the memory medium 1 is constituted between the holder 52 and the connector case 61. The memory medium 1 is inserted into the storage holding unit between the holder 52 and the connector case 61 from opened one end side opposite to the side where the connector 58 is disposed of the holder 52 with the contact portion 3 side being as insertion end to connect the contact portion 3 to the connector 58.

Figure 7:
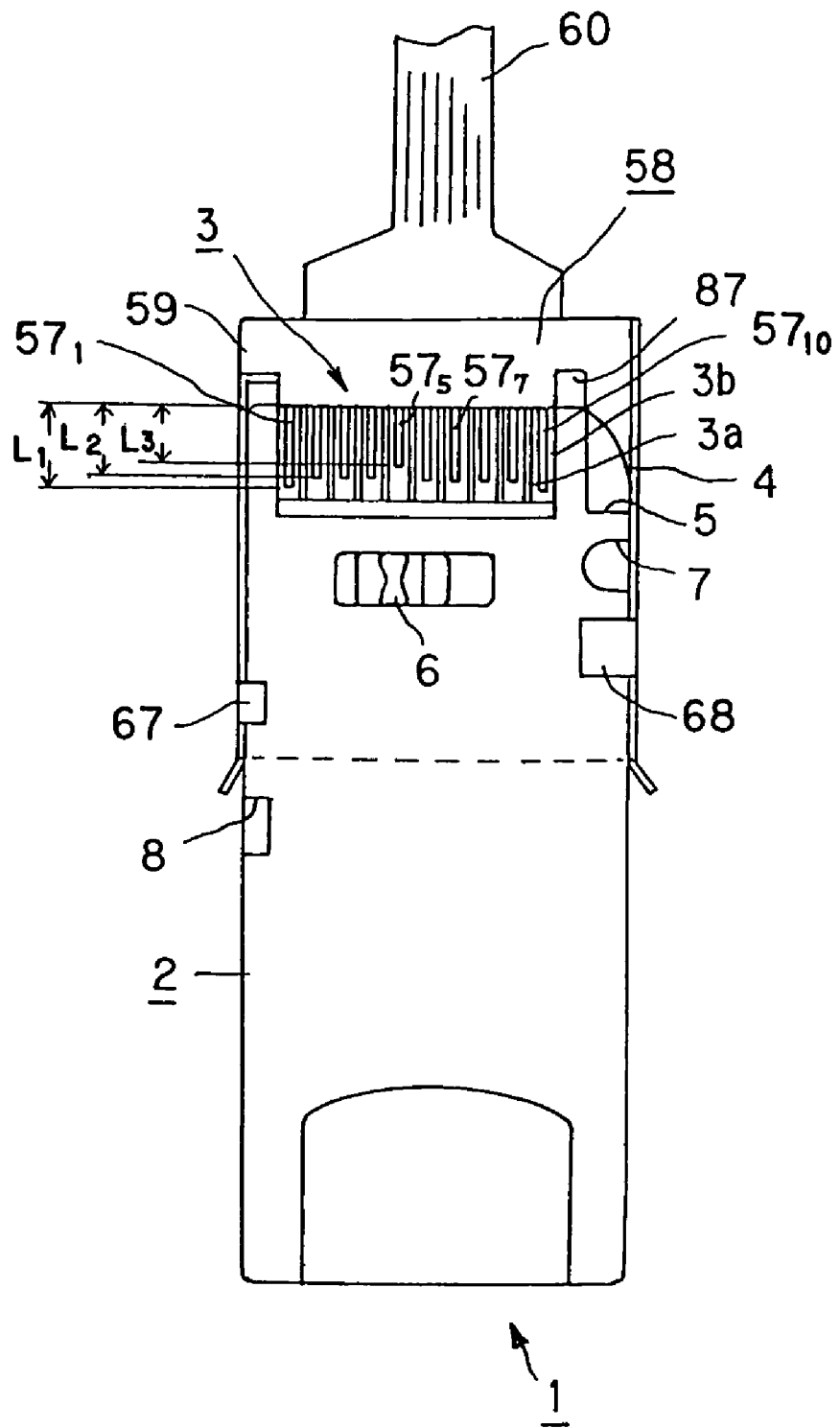
FIG. 7 is a bottom view showing the state where memory medium is connected to connector.

Meanwhile, as shown in FIG. 6, length $L_1$ of two connection terminals $57_1$ and $57_{10}$ serving as ground terminal of power supply positioned at the outermost side among plural connection terminals 57 provided at the connector 58 is formed so that it is longer than length $L_2$ of other connection terminals 57. This realizes the fact that when the memory medium 1 is inserted into the holder 52, contacts 3a of both sides are connected, first of all, to two connection terminals $57_1$, $57_{10}$ serving as ground terminal so that secure connection between the apparatus body side and power supply is established. Moreover, connection terminal $57_5$ which detects insertion/withdrawal of the memory medium 1 provided at the central portion of plural connection terminals 57 is formed so as to have the shortest length $L_3$. By forming the connection terminal $57_5$ for detection of insertion/withdrawal in this way, as shown in FIG. 7, when the memory medium 1 is inserted into the holder 52, contacts 3a are connected to other connection terminals 57, and are then connected to the connection terminal $57_5$ for detection of insertion/withdrawal, and when eject operation to pull the memory medium 1 from the holder 52 is carried out, connection to the contact 3a is released first of all. Accordingly, it is possible to detect precise connecting state with respect to the connector 58 of the memory medium 1. Thus, it is possible to realize reliable transmission/reception of signals between the memory medium 1 and the apparatus body side.

In this example, at the other side wall 54 side of the holder 52, there is provided an eject operation piece 69 operated by eject operation mechanism in ejecting the memory medium 1 which has been caused to undergo loading at the loading position.

As described above, the holder 52 to which the connector.58 where the memory medium 1 is electrically connected is attached is movably attached to a chassis 71 fixedly disposed within the houding 12 or 22 constituting the apparatus body in order to permit the memory medium 1 inserted and held at the holder 52 to undergo loading at a predetermined loading position within the apparatus body.

The chassis 71 is formed by punching and bending thin metallic plate, and is formed so as to constitute rectangular frame body as shown in FIG. 5, wherein first and second supporting walls 72, 73 which support the holder 52 are formed in a projected manner at both sides opposite to each other. At the first and second supporting walls 72, 73, there are bored slide guide holes 76, 77 formed as elongated hole adapted so that spindles 74, 75 which project portions of the first and second side walls 53, 54 of the holder 52 and are integrally formed with the first and second side walls 53, 54 are engaged, and there are provided holder supporting pieces 78, 79 which supports the bottom face side of the holder 52. The slide guide holes 76, 77 are provided at the side positioned inwardly of the equipment body when the chassis 71 is attached within the equipment body, and the holder supporting pieces 78, 79 are formed so as to take L-shape in cross section in the state positioned at the side where the memory medium 1 is inserted.

Figure 8:
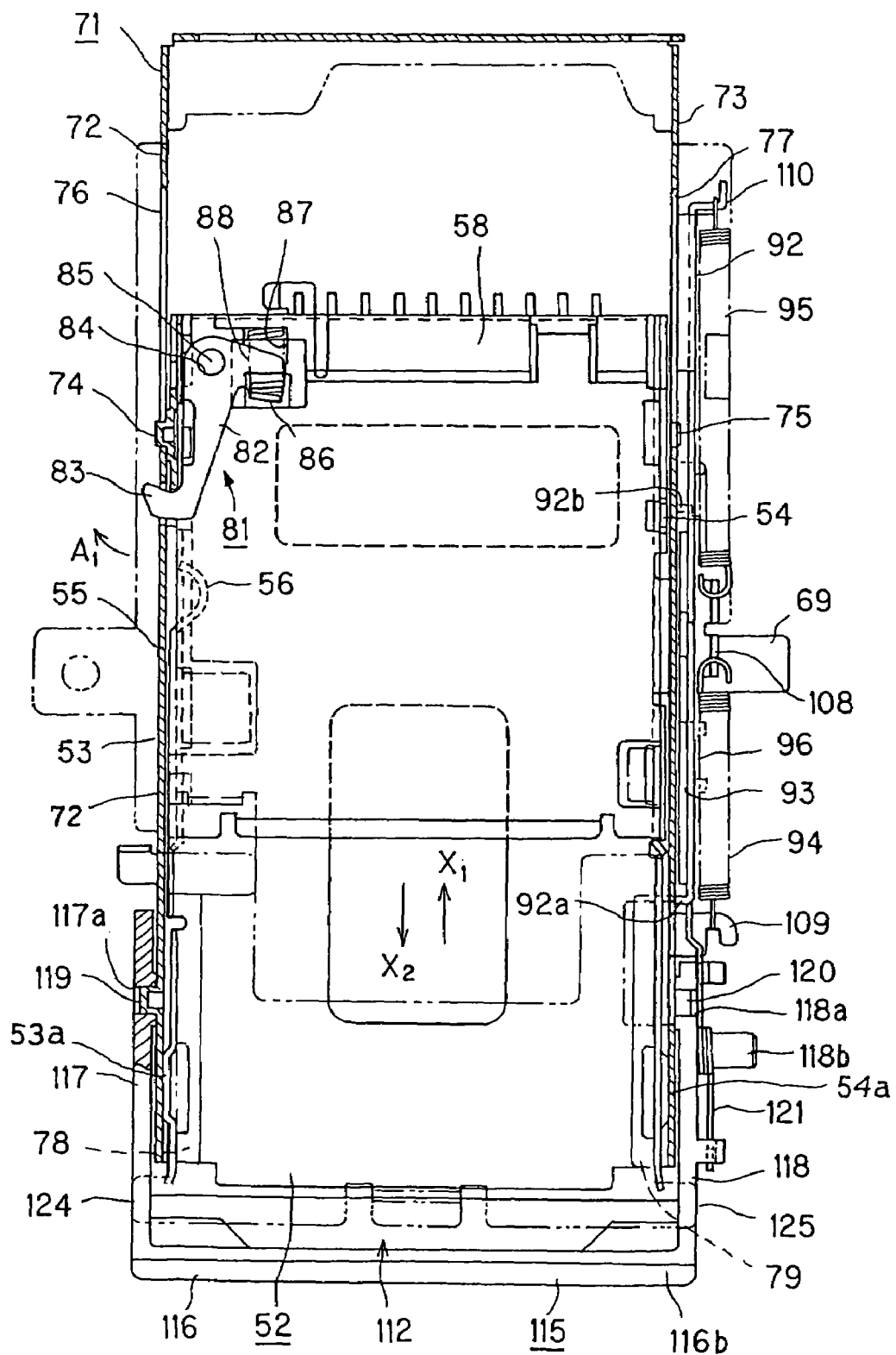
FIG. 8 is a plan view showing the state where holder is moved to initial position.
Figure 9:
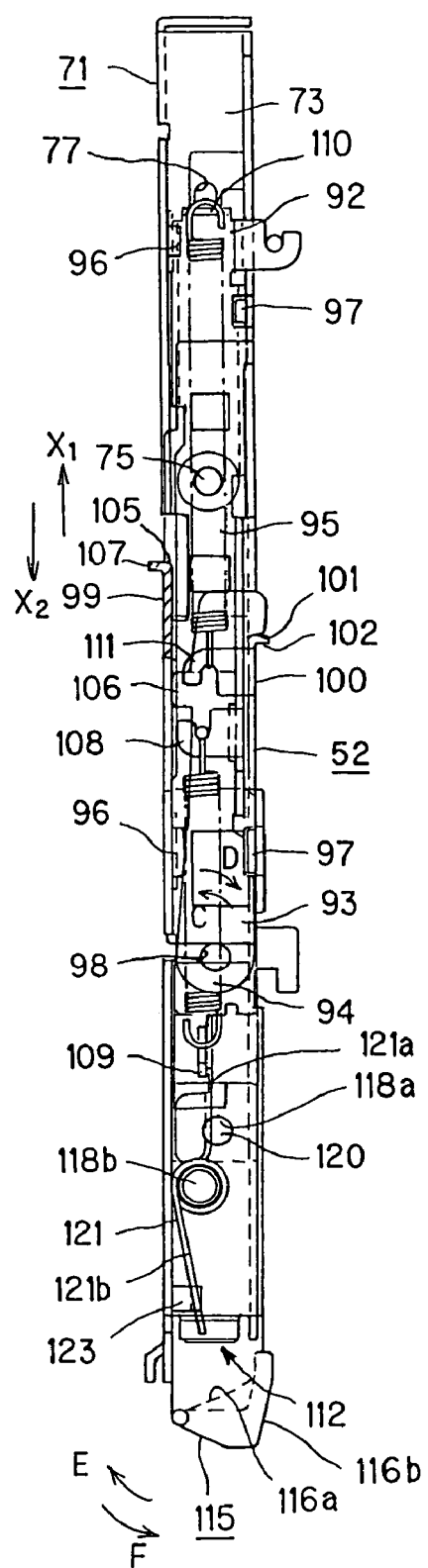
FIG. 9 is a side view showing the side where loading control mechanism including fluctuation lever is provided.

As shown in FIGS. 8 and 9, the holder 52 is disposed in such a manner that it is fitted between the first and second supporting walls 72, 73 of the chassis 71, and is adapted so that the spindles 74, 75 are inserted and engaged with respect to the slide guide holes 76, 77, and both sides of the bottom face side thereof are supported by the holder supporting pieces 78, 79, whereby the holder 52 is supported so that it can be moved in a manner bridging between eject position where insertion/withdrawal of the memory medium 1 is permitted and loading position where the memory medium 1 is moved to loading position.

In this example, at the first and second side walls 53, 54 of the holder 52, there are formed projection portions 53a, 54a for reducing contact resistance with respect to the first-and second supporting walls 72, 73 of the chassis 71 side. As the result of the fact that such projection portions 53a, 54a are formed, smooth movement with respect to the chassis 71 of the holder 52 is guaranteed.

As shown in FIG. 8, at the holder 52 movably supported by the chassis 71 as described above, there is provided a lock mechanism 81 adapted to lock the holder 52 until the holder 52 is located at initial position where insertion/withdrawal of the memory medium 1 is permitted, and the contact portion 3 of the memory medium 1 inserted into this holder 52 is connected to the connector 58 provided at the holder 52 side-thereafter to release lock to permit movement in the memory medium loading position direction of the holder 52.

The lock mechanism 81 comprises a lock lever 82 rotatably supported at one corner portion of the internal side of the holder 52. As shown in FIGS.5, the lock lever 82 is adapted so that a lock piece 83 engaged with a portion of the chassis 71 is provided at the front end side, and a pivotal hole 84 is bored at the base end portion side. As shown in FIG. 8, this lock lever 82 is rotatably supported with a spindle 85 formed by projecting a portion of plane surface portion of the holder 52 being as center by pivoting the pivotal hole 84 with respect to the spindle 85. The lock lever 82 is rotatably biased in the direction indicated by arrow A, in FIG. 8 where the lock piece 83 of the front end side is projected toward the chassis 71 side by a compression coil spring 88 serving as a biasing member disposed between a memory medium pressing piece 86 provided at the base end side and a spring engagement recessed portion 87 provided at the terminal supporting body 59 of the connector 58 attached to the holder 52.

Figure 10:
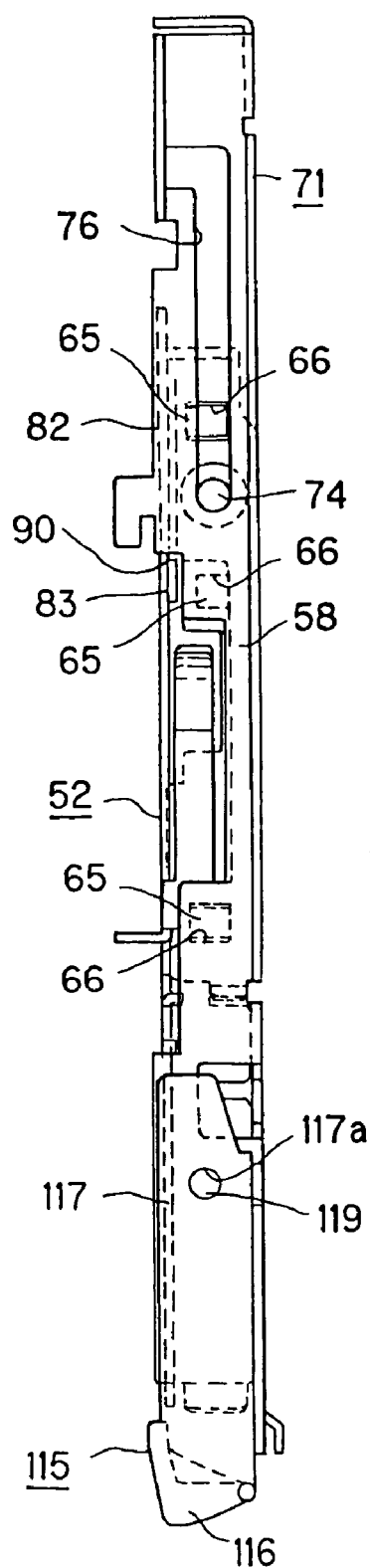
FIG. 10 is a side view showing the side where lock mechanism which locks holder at chassis is provided.

As shown in FIG. 8, the lock lever 82 is biased by the compression coil spring 88 when the holder 52 is located at the initial position where insertion/withdrawal of the memory medium 1 is permitted, and is projected toward the chassis 71 side through an insertion hole 89 bored by forming the engagement holding piece 55 at the first side wall 53 of the holder 52. As shown in FIG. 10, the lock piece 83 projected toward the chassis 71 side is engaged with an engagement recessed portion 90 formed by cutting a portion of the first supporting wall 72 of the chassis 71 to limit movement in the direction indicated by arrow $X_1$ in FIG. 8 of memory medium insertion direction of the holder 52.

In the loading unit to which the carrying apparatus according to the present invention is applied, there is provided a loading control mechanism 91 which controls loading operation and eject operation of the holder 52 into which the memory medium 1 has been inserted. As shown in FIGS. 8 and 9, the loading control mechanism 91 is provided at the second supporting wall 73 side of the chassis 71 which movably supports the holder 52 in the insertion/withdrawal direction of the memory medium 1. This loading control mechanism 91 comprises a slider 92 movably supported in the direction indicated by arrow $X_1$ or in the direction indicated by arrow. $X_2$ in FIG. 9 on the second supporting wall 73, a fluctuation lever 93 rotatably supported by the slider 92 and moved along with the slider 92, a first extension coil spring 94 serving as a first biasing member which is stretched between the slider 92 and the chassis 71 and movably biases the slider 92 in the eject direction of the direction indicated by arrow $X_2$ in FIG. 9, and a second extension coil spring 95 serving as a second biasing member which is streatched in a manner bridging between the slider 92 and the holder 52 and movably biases the holder 52 in the insertion direction of the memory medium 1 of the direction indicated by arrow $X_1$ in FIG. 9

As shown in FIG. 5, the slider 92 is formed so as to take elongated thin plate shape, and is adapted so that both sides in length direction are held by plural holding pieces 96, 97 formed at both sides of the second supporting wall 73 of the chassis 71 so that it is movably supported on the second supporting wall 73.

Figure 11:
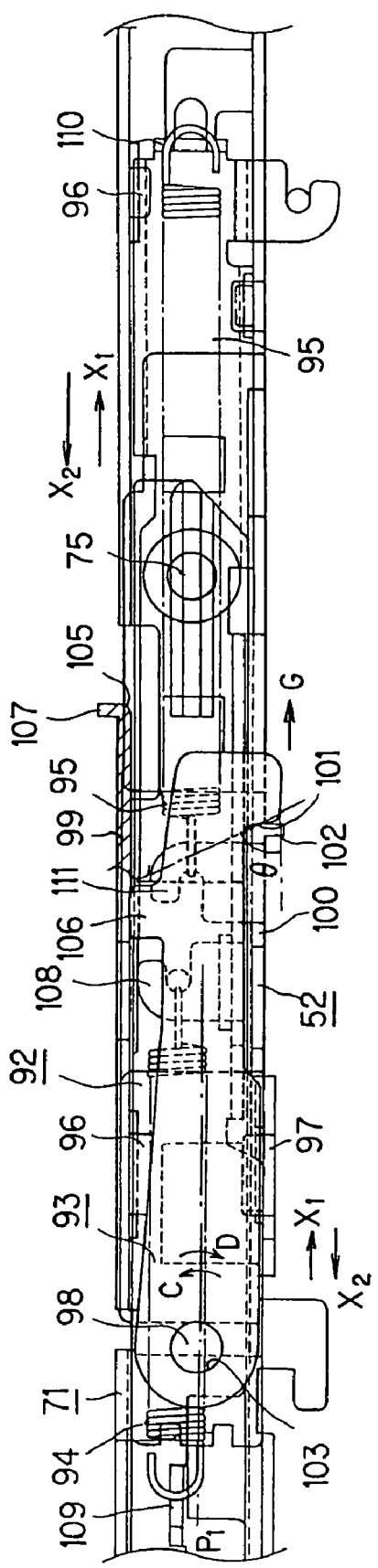
FIG. 11 is a side view showing loading control mechanism when holder is moved to initial position.

The fluctuation lever 93 is rotatably supported in the direction indicated by arrow C and in the direction indicated by arrow D in FIGS. 9 and 11 with a spindle 98 provided at the base end portion side being as center by pivoting the spindle 98 with respect to a pivotal hole 103 bored at one end side of the slider 92. The rotational range with the spindle 98 being as center of this fluctuation lever 93 is limited by a portion of the chassis 71 and the holder 52 movably supported by this chassis 71. Namely, as shown in FIGS. 9 and 11, the rotational range of the fluctuation lever 93 is limited so that the fluctuation lever 93 is rotated between a rotational limiting piece 99 formed by bending one side edge of the second supporting wall 73 and a rotation limiting piece 100 projected from one side edge of the holder 52.

The fluctuation lever 93 is disposed in such a manner that it is put between the side wall 73 of the chassis 71 and the slider 92 so that falling off from the slider 92 is prevented. The spindle 98 is formed by projecting a portion of the fluctuation lever 93 by striking out. In this example, at the slider 92, as shown in FIG. 8, there are provided bent portions 92a, 92b for ensuring space for disposing the fluctuation lever 93 between the slider 92 and the side wall 73.

At one side of the front end side of the fluctuation lever 93, there is provided an engagement portion 101 formed as inclined surface portion engaged with a portion of the holder 52. As shown in FIGS. 8 and 11, this engagement portion 101 is provided in the state inclined with respect to the holder 52 movement direction, and is engaged with a portion of the holder 52 when the holder 52 is located at the initial position shown in FIG. 8. The portion with which the engagement portion 101 is engaged of the holder 52 side is a portion formed by cutting and raising a portion of the front end side of a rotation limiting piece 100 which limits rotation of the fluctuation lever 93, and is a pressing operation piece 102 of the fluctuation lever 93.

At the middle portion of the side edge opposite to the side where the engagement portion 101 is provided of the fluctuation lever 93, there is projected an engagement piece 106 in contact with the rotation limiting piece 99 of the chassis 71 side, and engaged with an engagement hold 105 formed by cutting a portion of the rotation limiting piece 99 of the chassis 71 side when the holder 52 is moved in memory medium insertion direction, i.e., in the direction indicated by arrow $X_1$ in FIG. 8 by a predetermined quantity from the initial position. In this example, at the side edge of the side where the engagement piece 106 is engaged of the engagement hole 105, there is formed a rising piece 107 in order to realize reliable engagement with the engagement piece.

The slider 92 which has supported the fluctuation lever 93 constituted as described above is biased in the direction indicated by arrow $X_2$ in FIGS. 9 and 11 by the first extension coil spring 94 stretched between a spring holding piece 108 formed at the middle portion in length direction and a spring holding piece 109 provided at the chassis 71. Namely, the slider 92 is biased in the eject direction opposite to the direction where the memory medium 1 is inserted into the holder 52 by the first extension coil spring 94.

Moreover, the second extension coil spring 95 stretched between the slider 92 and the holder 52 is stretched between a spring holding piece 110 formed at the front end side of the slider 92 and a spring holding piece 111 formed at the middle portion of one side of the holder 52 to move and bias the holder 52 in the insertion direction of the memory medium 1 of the direction indicated by arrow $X_1$ in FIG. 9.

At one end side of the chassis 71, i.e., the side where a memory medium insertion/withdrawal portion 112 for carrying out insertion/withdrawal of the memory medium 1 is provided with respect to the holder 52, there is attached an opening/closing cover 115 which opens or closes the memory insertion/withdrawal portion 112, and is opposed to the memory medium insertion/withdrawal opening 13 or 27 provided at the recording/reproducing apparatus 11 or 21 when this loading unit 51 is assembled into the previously described recording/reproducing apparatus 11 or 21 as shown in FIG. 3 or 4 to open or close the insertion/withdrawal opening 13 or 27.

As shown in FIGS. 8 and 9, the opening/closing cover 115 is rotatably attached by supporting a pair of rotation arms 117, 118 provided at both sides of a cover portion 116 which opens or closes the memory medium insertion/withdrawal portion 112 at both sides of the side where the memory medium insertion/withdrawal portion 112 is formed of the chassis 71 to thereby open or close the memory medium insertion/withdrawal portion 112. Namely, the opening/closing cover 115 is rotatably attached with these spindles 119, 120 bored at the first and second supporting wall side walls 72, 73 of the chassis 71 being as center in the state where pivotal holes 117a, 118a bored at the front end portions of rotation axis 117, 118 are pivoted with respect to the spindles 119, 120. The opening/closing cover 115 is rotationally biased in the direction indicated by arrow E in FIG. 9 of the direction to always close the memory medium insertion/withdrawal portion 112 or the memory medium insertion/withdrawal opening 13 or 27 by a torsion coil spring 121 serving as a rotation biasing member. The torsion coil spring 121 rotationally biases the opening/closing cover 115 in the direction indicated by arrow E in FIG. 9 by inserting coil portion into spindle 118b bored at the other rotation arm 118 to hold one arm portion 121a at the spring holding piece 109 provided at the chassis 71 side to form the other arm portion 121b at a spring holding portion 123 provided at the opening/closing cover 115 side.

The opening/closing cover 115 is adapted to allow the rotation arms 117, 118 to be in contact with rotation limiting pieces 124, 125 projected at the both sides of the chassis 71 so that rotation biasing position by the torsion coil spring 121 is limited, and is held at the position where the memory medium insertion/withdrawal portion 112 is closed.

As shown in FIGS. 5 and 8, the opening/closing cover 115 is attached in such a manner to project the cover portion 116 from the front end of the chassis 71. The upper surface of the cover portion 116 projected from the chassis 71 is caused to be a pressing operation portion 116b which is caused to undergo pressing operation by the memory medium 1 inserted into the holder 52. Namely, the opening/closing-cover 115 is caused to undergo pressing operation from the pressing operation portion 116b side of the upper surface of the cover portion 116, whereby it is rotationally operated in the direction indicated by arrow F in FIG. 9 of the direction to open the memory medium insertion/withdrawal portion 112 against biasing force of the torsion coil spring 121.

As shown in FIG. 9, the inner surface of the cover portion 116, i.e., the surface opposite to the rear surface of the memory medium 1 inserted into the holder 52 is caused to be curved surface 116a or inclined surface. By providing the curved surface 116a or the inclined surface at the inner surface of the cover portion 116, the curved surface 116a or the inclined surface is caused to undergo pressing operation by the memory medium 1 ejected from the holder 52, thereby making it possible to rotate the opening/closing cover 115 against biasing force of the torsion coil spring 121. The opening/closing cover 115 is rotated in a direction to open the memory medium insertion/withdrawal portion 112 or the memory medium insertion/withdrawal opening 13 or 27 in relation to the eject operation of the memory medium 1.

In the loading apparatus 51 according to the present invention constituted as described above, when the holder 52 is located at the initial position serving as eject position shown in FIGS. 8 and 9 where insertion/withdrawal of the memory medium 1 is permitted, the holder 52 is placed in the state where the insertion/withdrawal side of the memory medium 1 is caused to be located at the position closest to the memory medium insertion/withdrawal portion 112 of the chassis 71. At this time, the slider 92 which has supported the fluctuation lever 93 undergoes biasing force of the first extension coil spring 94 so that it is moved and biased in the direction indicated by arrow $X_2$ in FIGS. 9 and 11, and the fluctuation lever 93 supported by this slider 92 is also moved and biased in the same direction. When the holder 52 is placed at the initial position, the fluctuation lever 93 is adapted to allow the engagement piece 106 to be in contact with the rotational limiting piece 99 provided at the chassis 71 to allow the engagement portion 101 to be in contact with the pressing operation piece 102 provided at the holder 52 so that it is engaged therewith in the state where movement in the direction indicated by arrow C in FIG. 11 is limited. At this time, since the fluctuation lever 93 supported by the slider 92 moved and biased in the direction indicated by arrow $X_2$ in FIGS. 9 and 11 by the first extension coil spring 94 allows the engagement piece 106 to be in contact with the rotation limiting piece 99 while being moved and biased in the direction indicated by arrow $X_2$ in FIGS. 9 and 11, the fluctuation lever 93 is placed in the state where it is rotated and biased in the direction indicated by arrow D in FIGS. 9 and 11 with the spindle 98 in a direction opposite to the direction in contact with the rotation limiting piece 99 being as center to press the engagement portion 101 toward the pressing operation piece 102 of the holder 52.

When the holder 52 is located at the initial position shown in FIGS. 8 and 9, the engagement portion 101 of the fluctuation lever 93 is in contact with the pressing operation piece 102. Accordingly, there results the state where movement in the memory medium insertion direction of the direction indicated by arrow $X_1$ in FIGS. 9 and 11 by the second extension coil spring 95 stretched between the holder 52 and the slider 92 is limited.

It is to be noted that the initial position of the holder 52 is limited by allowing spindles 74, 75 to be in contact with the end portions of slide guide holes 76, 77 of the chassis 71 side.

Further, when the holder 52 is located at the initial position, the lock lever 82 constituting the lock mechanism 81 undergoes biasing force of the compression coil spring 88 so that it is rotationally biased in the direction indicated by arrow A in FIG. 8. Thus, the lock piece 83 is engaged with the engagement recessed portion 90 of the chassis 71 to place the holder 52 in the state where movement in the memory medium insertion direction of the direction indicated by arrow $X_1$ in FIG. 8 thereof is limited.

Furthermore, the opening/closing cover 115 is also caused to undergo biasing force of the torsion coil spring 121 so that it is rotationally biased at the position where the memory medium insertion/withdrawal portion 112 is closed.

Figure 12:
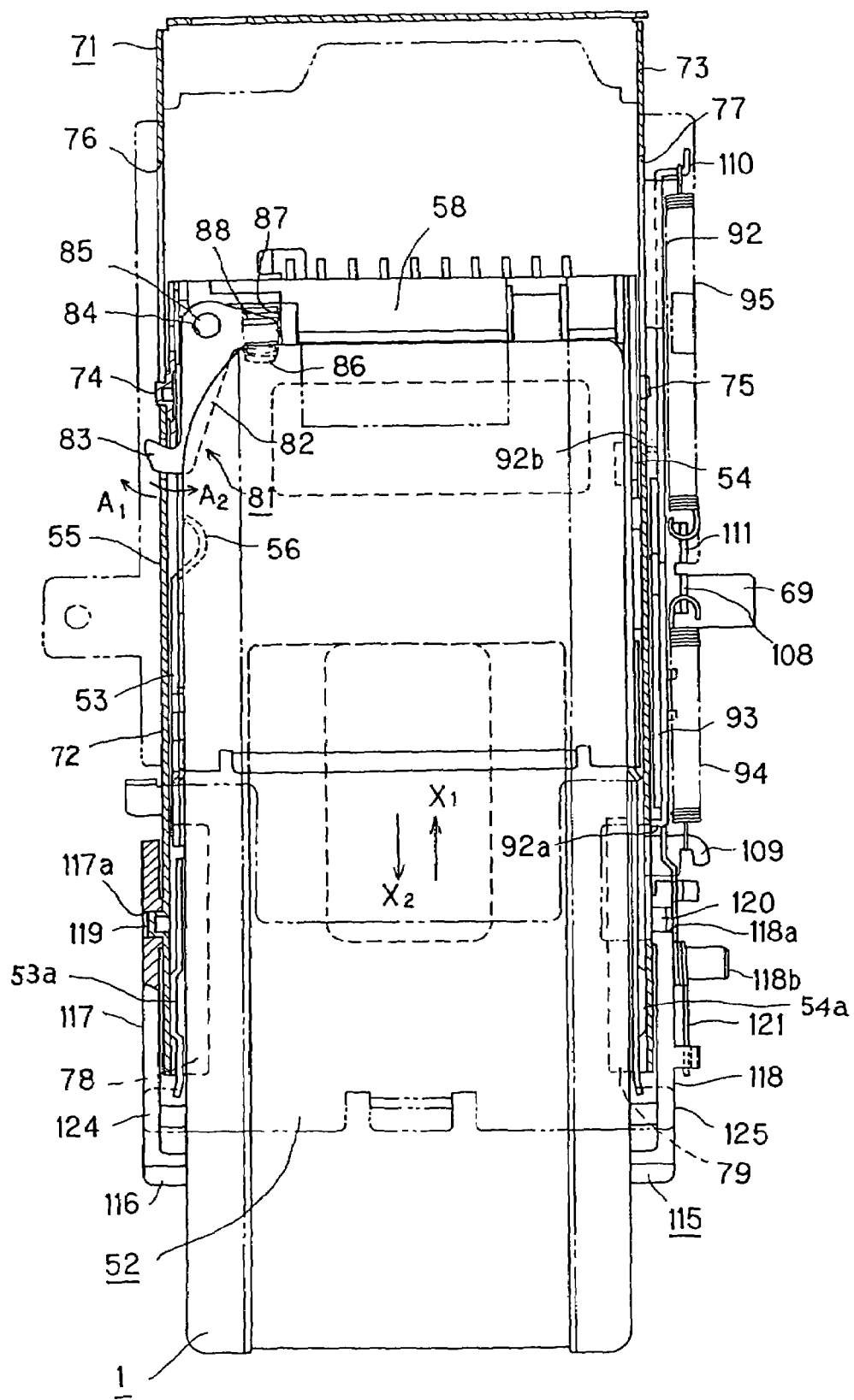
FIG. 12 is a plan view showing the state where memory medium is inserted into holder so that contact portion of the memory medium is connected to connector.
Figure 13:
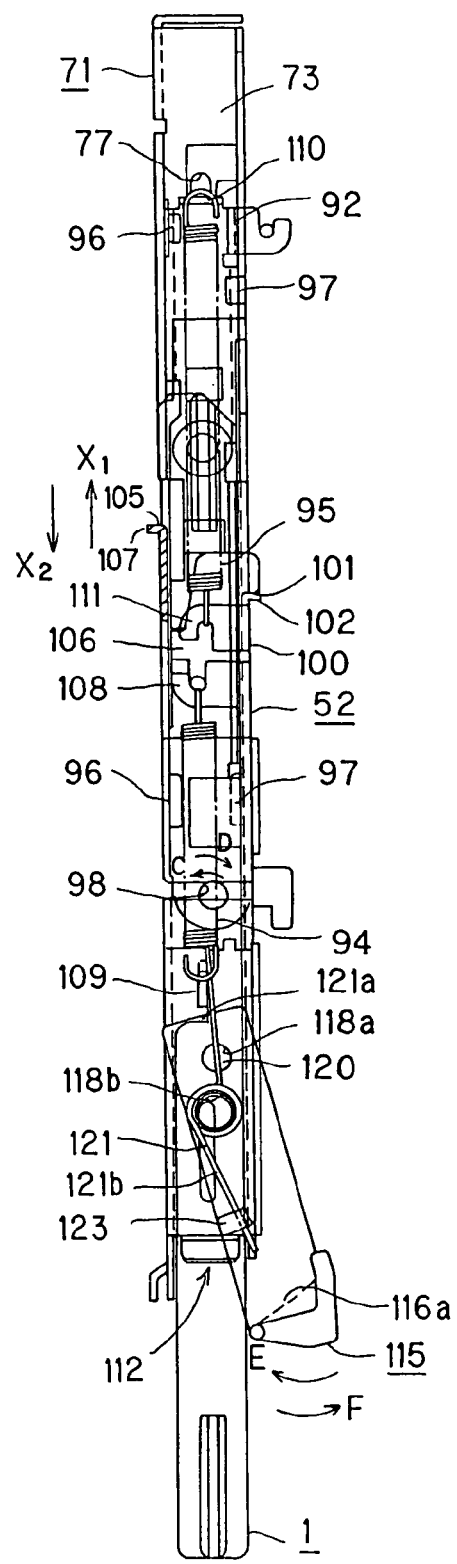
FIG. 13 is a side view showing the state where memory medium is inserted into holder so that contact portion of the memory medium is connected to connector.

In order to load the memory medium 1 at the memory medium loading portion within the recording/reproducing apparatus by using the loading unit 51 to which the carrying apparatus according to the present invention has been applied, the memory medium 1 is inserted into the holder 52 through the memory medium insertion/withdrawal portion 112 with one end side where the contact portion 3 is provided being as insertion end as shown in FIGS. 12 and 13. When the memory medium 1 is inserted into the holder 52, a pressure operation portion 116b is pressed by the plane surface of the insertion end side of the memory medium 1 to rotate the opening/closing cover 115 against biasing force of the torsion coil spring 121 to open the memory medium insertion/withdrawal portion 112.

At this time, the memory medium 1 is inserted in the state where the side in which the erroneous insertion preventing groove 5 is provided is positioned at the side where the lock lever 82 within the holder 52 is provided.

At the side where the contact portion 3 serving as insertion end of the memory medium 1, partitioning walls which partition plural contacts 3 a are projected. Accordingly, even if the contact portion 3 side is caused to be in contact with the opening/closing cover 115, it is prevented that the opening/closing cover 115, etc. is directly in contact with the contact 3a.

When the opening/closing cover 115 is rotated to face the side where the contact portion 3 is provided to the holder 52 to further insert the memory medium 1 into the holder 52, respective contacts 3a of the contact portion 3 are electrically and mechanically connected to respective connection terminals 57 of the connector 58 provided at the holder 52 side as shown in FIG. 7. When the contact portion 3 is connected to the connector 58, contacts 3a of both sides are connected, first of all, to two connection terminals $57_1$, $57_{10}$ serving as the longest ground terminal as previously described, and central contact 3a is last connected to the shortest connection terminal $57_5$. Accordingly, as the result of the fact that all contacts 3a are electrically connected to connection terminals 57 of the connector 58 side, it is detected that the memory medium 1 is inserted into the holder 52. By employing such configuration, reliable insertion into the holder 52 of the memory medium can be realized.

When the memory medium 1 is inserted into the holder 52 until the position where connection between the contact portion 3 and the connector 58 is carried out, the engagement portion 56 of the engagement holding piece 55 is engaged with the first engagement recessed portion 7 to realize reliable holding with respect to the holder 52 of the memory medium 1.

The holder 52 is placed in the state where movement thereof is limited by the lock mechanism 81 until the contact portion 3 of the memory medium 1 is completely connected to the connector 58 attached to the holder 52. Namely, until the contact portion 3 of the memory medium 1 is completely connected to the connector 58, the lock lever 82 is engaged with the engagement recessed portion 87 of the chassis 71 as shown in FIG. 12 to limit movement of the holder 52.

Until connection between the contact portion 3 and the connector 58 is carried out, movement of the holder 52 is limited. Accordingly, connection between the contact portion 3 and the connector 58 can be carried out only by insertion operation into the holder 52 of the memory medium 1. Thus, insertion operation into the holder 52 of the memory medium 1, and electric and mechanical connecting operation thereof extremely become easy.

Figure 14:
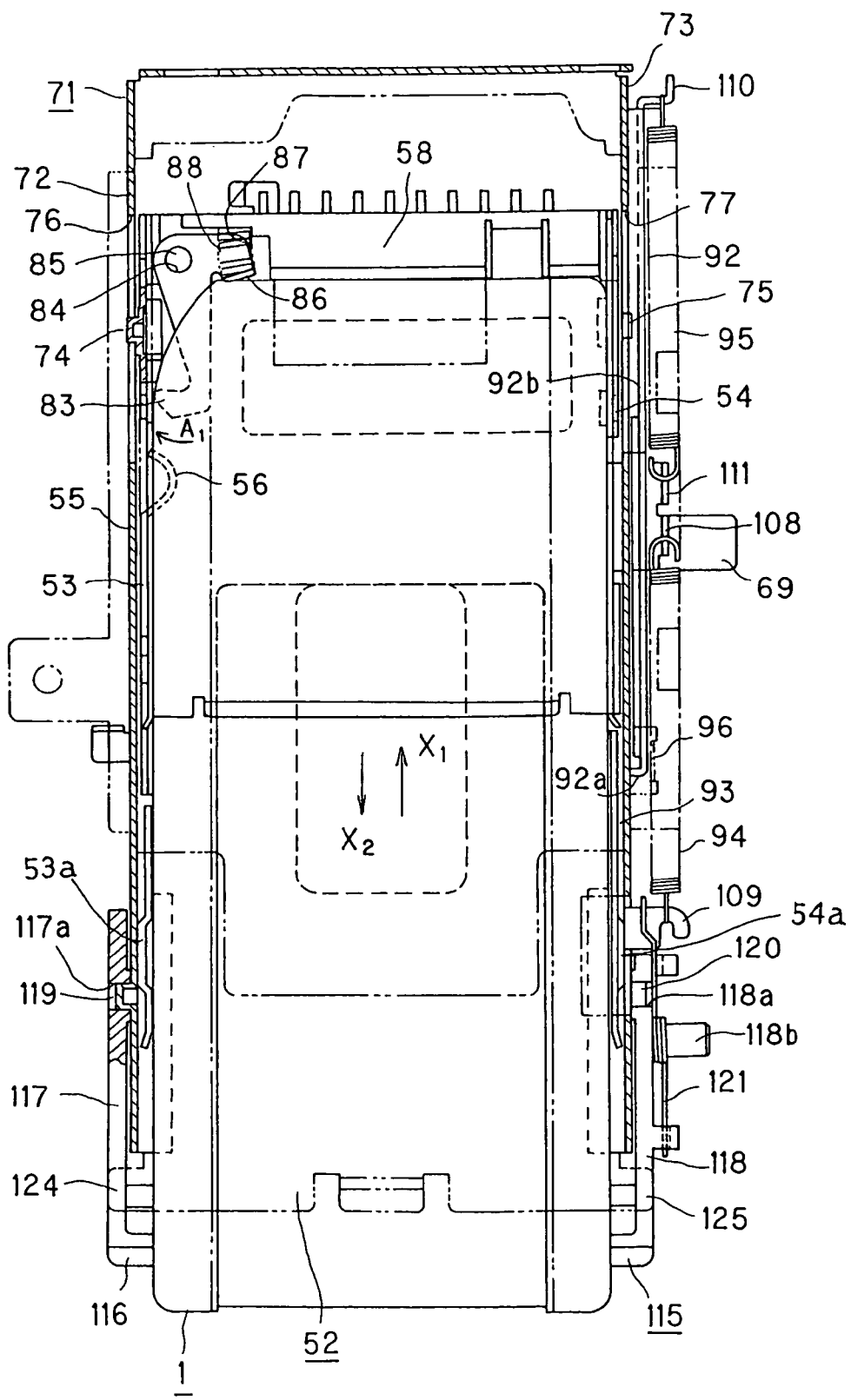
FIG. 14 is a plan view showing the state where fluctuation lever is moved by holder in memory medium insertion direction and is then fluctuated so that it is engaged with chassis.

After connection between the contact portion 3 and the connector 5 8 is carried out, when the memory medium 1 is further inserted in the memory medium insertion direction of the direction indicated by arrow $X_1$ in FIG. 12, the memory medium pressing piece 86 is pressed by insertion end of the memory medium 1 so that the lock lever 82 is rotated in the direction indicated by arrow $A_2$ in FIG. 12 against biasing force of the compression coil spring 88. Thus, as shown in FIG. 14, engagement with respect to the engagement recessed portion 90 of the lock piece 83 is released. As a result, there results the state where further insertion in the memory medium insertion direction of the direction indicated by arrow $X_1$ in FIG. 14 of the holder 52 is permitted.

Since the holder 52 is located at the initial position until the time point when the memory medium 1 is inserted into the holder 52 so that lock of the lock lever 82 is released, there results the state where the engagement portion 101 of the fluctuation lever 93 constituting the loading control mechanism 91 is in contact with the pressing operation piece 102 as shown in FIG. 11. Namely, the holder 52 is adapted so that lock by the lock mechanism 81 is released so that there results the state where movement in the memory medium insertion direction is permitted, and there results the state where the pressing operation piece 102 is caused to be in contact with the engagement portion 101 of the fluctuation lever 93.

Here, when the memory medium 1 is caused to undergo pressing operation to further insert the holder 52 in the memory medium insertion direction of the direction indicated by arrow $X_1$ in FIG. 14, the engagement portion 101 is pressed by the pressing operation piece 102. As a result, the fluctuation lever 93 is moved in the direction indicated by arrow $X_1$ in FIG. 13. Thus, the slider 92.where this fluctuation lever 93 is supported is moved in the same direction so as to expand the first extension coil spring 94. The first extension coil spring 94 is expanded as the result of the fact that the slider 92 is moved, whereby biasing force which moves the holder 52 in the eject direction of the initial position direction is stored.

At this time, the fluctuation lever 93 is in the state where the engagement piece 106 is in contact with the rotation limiting piece 99 of the chassis 7 1 so that rotation in the direction indicated by arrow C in FIG. 13 is limited to maintain the state where the engagement portion 101 is caused to be in contact with the pressing operation piece 102 of the holder 52 side.

Namely, as shown in FIG. 11, when the engagement piece 101 provided at the position deviating toward one side from center line P1 passing through the spindle 89 serving as fulcrum of rotation is pressed in the line direction of the direction indicated by arrow G in FIG. 11 by the pressing operation piece 102 of the holder 52 side, the fluctuation lever 93 is rotationally biased in the direction indicated by arrow C in FIG. 11 with the spindle 89 being as center. Accordingly, when the fluctuation lever 93 is caused to undergo pressing operation by the holder 52, it is rotationally biased in a direction to allow the engagement portion I 01 to be away from the pressing operation piece 102. Here, as shown in FIG. 11, the engagement portion 101 is formed as inclined surface portion inclined by a predetermined angle θ with respect to the pressing direction by the pressing operation piece 102. Namely, since the engagement portion 101 is inclined in the direction where it is rotationally biased by the pressing operation piece 102, it can receive pressing force by the pressing operation piece 102 from the direction substantially perpendicular thereto. Thus, it is possible to efficiently press the fluctuation lever 93 by the holder 52.

When the memory medium 1 inserted into the holder 52 is pressed by finger in the state where the pressing operation piece 102 is engaged with the engagement portion 101 to further insert the holder 52 in the memory medium insertion direction of the direction indicated by arrow $X_1$ in FIG. 14, the fluctuation lever 93 is moved in the direction indicated by arrow $X_1$ in FIG. 14 in one body with the slider 92 while expanding the first extension coil spring 94. When the engagement piece 106 reaches the position opposite to the engagement hole 105 formed by cutting a portion of the rotation limiting piece 99 provided at the chassis 71 side, rotation limitation of the fluctuation lever 93 by the rotation limiting piece 99 is released so that the fluctuation lever 93 is rotated in the direction indicated by arrow C in FIGS. 15 and 16 to release engagement with the pressing operation piece 102 of the engagement portion 101 to engage the engagement piece 106 with the engagement hole 105.

Figure 15:
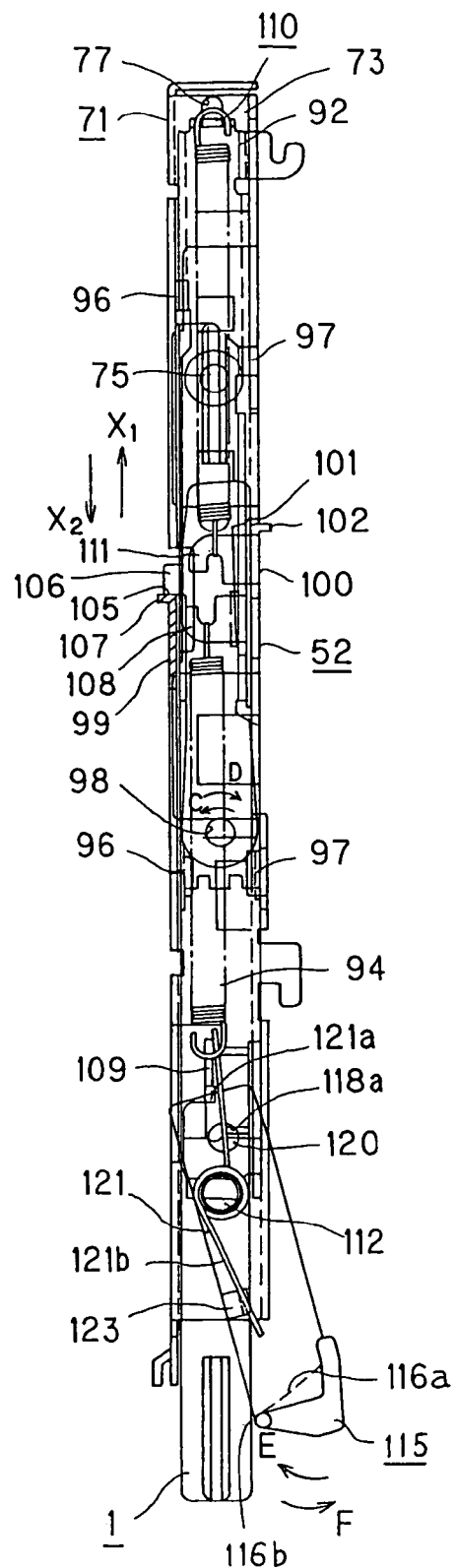
FIG. 15 is a side view showing the state where engagement between fluctuation lever and holder is released so that the fluctuation lever is engaged with chassis.
Figure 16:
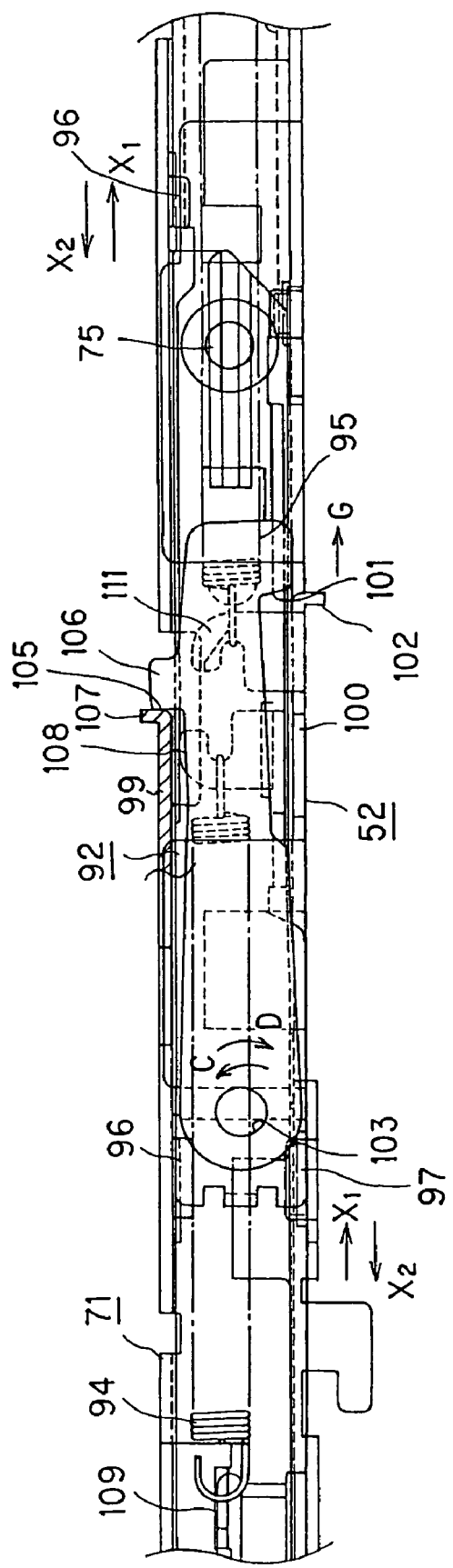
FIG. 16 is a side view of loading control mechanism showing the state where engagement between fluctuation lever and holder is released so that the fluctuation lever is engaged with chassis.
Figure 17:
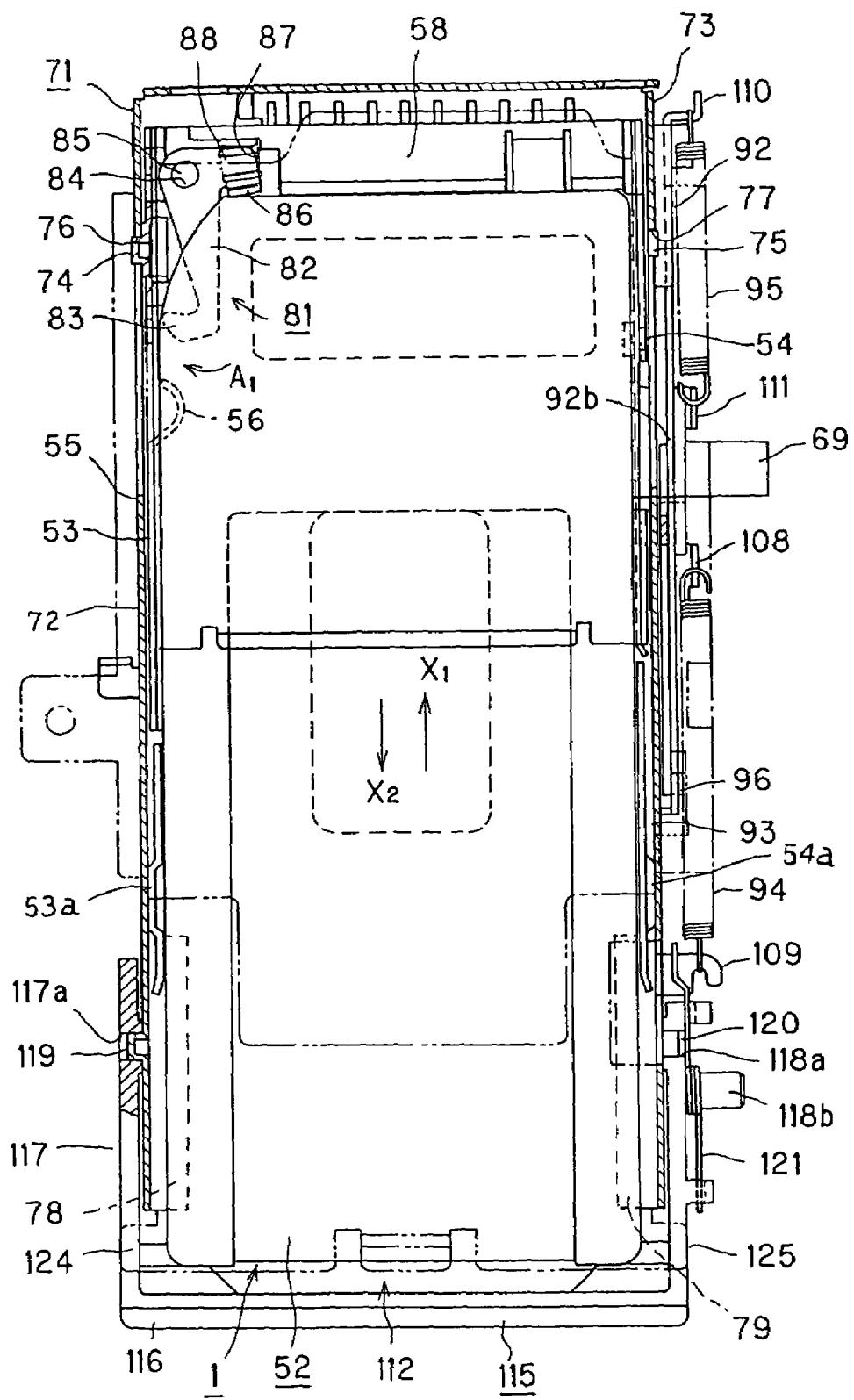
FIG. 17 is a plan view showing the state where memory medium inserted into holder is caused to undergo loading at loading position.
Figure 18:
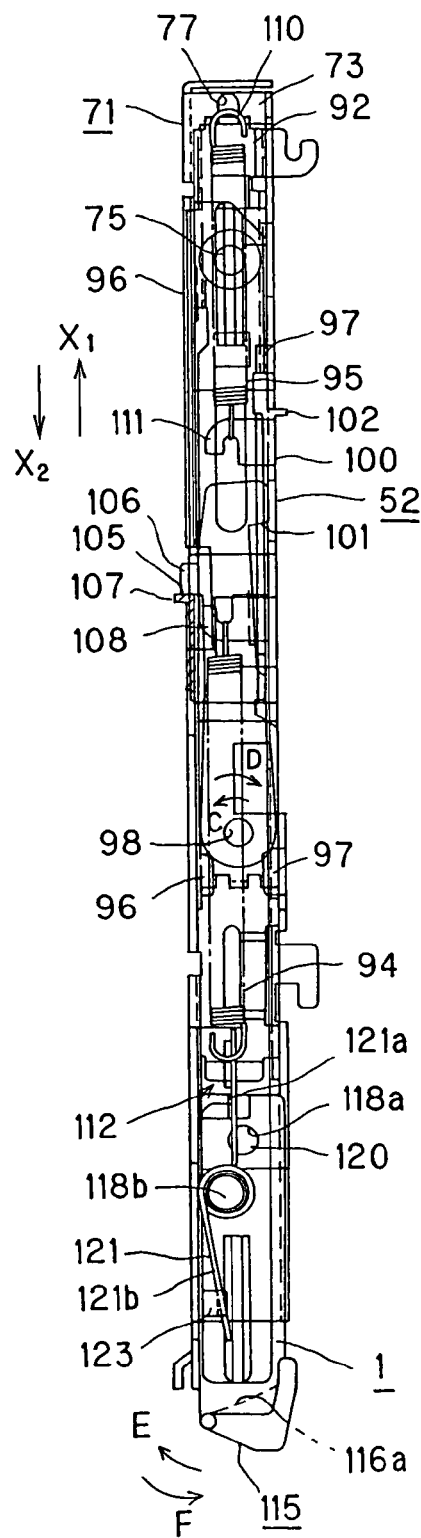
FIG. 18 is a side view showing the state where holder is caused to undergo biasing force of second extension coil spring so that it is moved to memory medium loading position.

When the engagement piece 106 of the fluctuation lever 93 is engaged with the engagement hole 105 of the chassis 71 side, the slider 92 is caused to undergo movement operation by the holder 52 so that it is held at the position where the first extension coil spring 94 is expanded as shown in FIG. 15. At this time, the holder 52 is placed in the state movable with respect to the slider 92 held at the position where the first extension coil spring 94 has been expanded as the result of the fact that engagement with respect to the engagement portion 101 of the fluctuation lever 93 of the pressing operation piece 102 is released. The holder 52 undergoes biasing force of the second extension coil spring 95 placed in the state expanded between this holder 52 and the slider 92 so that it is moved in the memory medium insertion direction of the direction indicated by arrow $X_1$ in FIGS. 14 and 15. Thus, as shown in FIGS. 17 and 18, the holder 52 is moved up to the memory medium loading position to allow the held memory medium 1 to undergo loading at the loading position.

Figure 19:
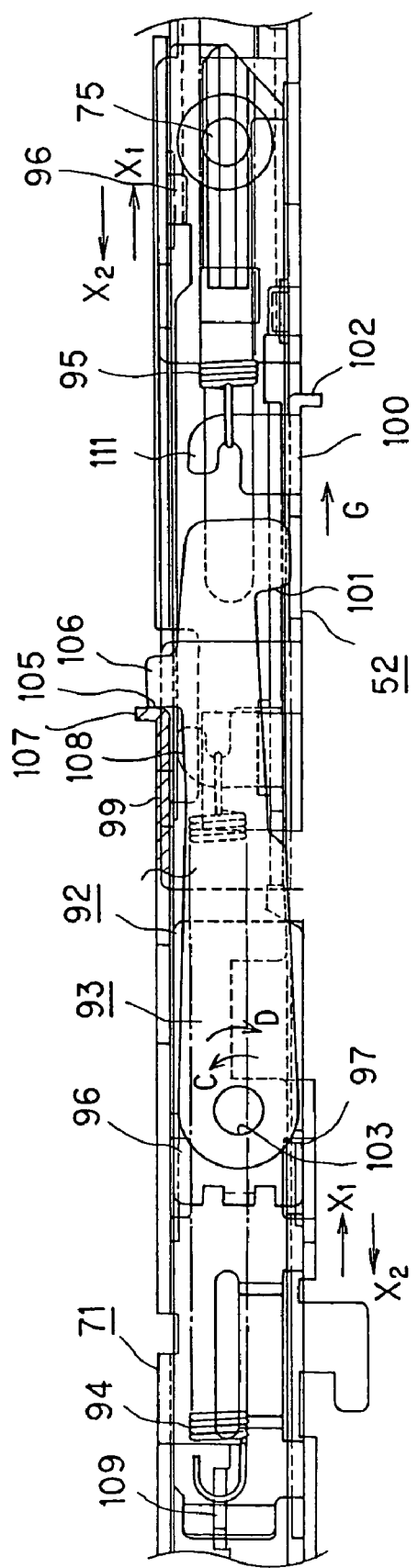
FIG. 19 is a side view showing loading control mechanism when holder is caused to undergo biasing force of second extension coil spring so that the holder is placed in the state where it is moved to memory medium loading portion.

In this example, when the holder 52 is moved in the memory medium insertion direction, the fluctuation lever 93 is placed in the state where one side of the front end side where the engagement portion 101 is provided is in contact with the rotation limiting piece 100 of the holder 52 side so that rotation in the direction indicated by arrow D in FIG. 19 is limited. As the result of the fact that rotation in the direction indicated by arrow D in FIG. 19 of the fluctuation lever 93 is limited, engagement state with respect to the engagement hole 105 of the chassis 71 side of the engagement piece 106 is securely maintained to maintain the state where the first extension coil spring 94 is expanded.

When the holder 52 which has held the memory medium 1 is drawn or pulled up to the memory medium loading position, the memory medium 1 is completely drawn or pulled into the apparatus. As a result, the opening/closing cover 115 which has been rotated by the memory medium 1 inserted into the holder 52 undergoes biasing force of the torsion coil spring 121 so that it is rotated to close the memory medium insertion/withdrawal portion 112 as shown in FIG. 18 to complete loading operation of the memory medium 1.

It is to be noted that a drawing force which draws or pulls the holder 52 into which the memory medium 1 is inserted can be arbitrarily set by changing force value of the second extension coil spring 95.

As described above, the loading unit 51 according to the present invention is adapted to insert the memory medium 1 into the holder 52 until the contact portion 3 is connected to the connector 58, whereby when the memory medium 1 is further pressed by finger, the memory medium 1 can be automatically loaded with respect to a predetermined memory medium loading portion by utilizing biasing force of biasing member such as spring, etc.

As shown in FIGS. 17 and 18, in order to eject the memory medium 1 loaded at the memory medium loading position, there is employed an approach to operate the eject operation piece 69 provided at the holder 52 to move the holder 52 in a direction to eject the memory medium 1 in the direction indicated by arrow $X_2$ in FIGS. 17 and 18 against biasing force of the second extension coil spring 95.

In the case where the loading unit 51 to which the carrying apparatus according to the present invention is applied is applied to the previously described recording/reproducing apparatus 11 or 21 as shown in FIG. 3 or FIG. 4, the eject operation mechanism comprised of eject lever, etc. provided at the recording/reproducing apparatus 11, or 21 side is caused to be related to eject operation piece 69 to allow eject operation buttons 41, 42 constituting the eject operation mechanism to undergo pressing operation to thereby allow the eject operation piece 69 to undergo movement operation to thereby move the holder 52.

It is to be noted that, as the eject operation mechanism used here, there may be employed a mechanism operated by manual operation or electric operation using electromagnetic drive means, etc.

When the holder 52 is moved in the eject operation of the direction indicated by arrow $X_2$ in FIGS. 17 and 18, it is relatively moved with respect to the fluctuation lever 93 placed in the state where the engagement piece 106 is engaged with the engagement hole 105 of the chassis 71 side. When the holder 52 is further moved in the direction indicated by arrow $X_2$ in FIGS. 17 and 18, one side of front end side thereof is caused to be in contact with the portion on the rotation limiting piece 100 so that the fluctuation lever placed in the state where rotation in the direction indicated by arrow D in FIG. 18 has been limited is rotated in the direction indicated by arrow D in FIG. 18.

Figure 21:
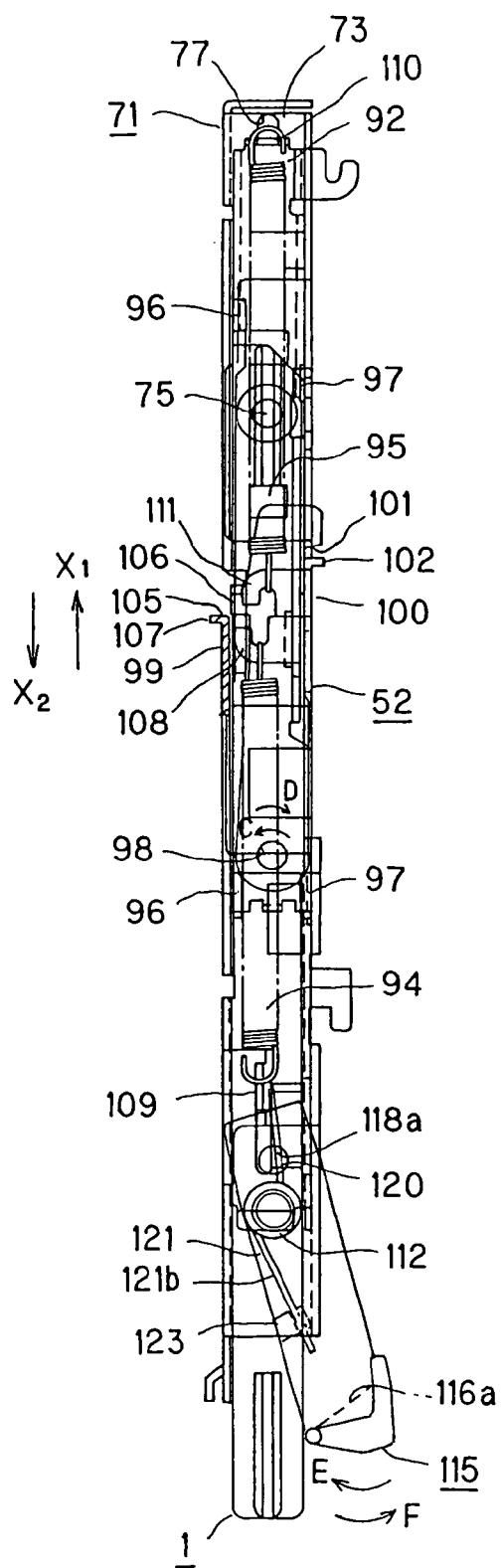
FIG. 21 is a side view showing the state where memory medium loaded into holder is ejected.

The fluctuation lever 93 which is held at the position where the first extension coil spring 94 has been expanded and is supported by the slider 92 which has been moved and biased in the direction indicated by arrow $X_2$ in FIG. 21 engages the engagement piece 106 with the engagement hole 105 of the chassis 71 sidewhile being moved and biased in the direction indicated by arrow $X_2$ in FIG. 21, whereby the fluctuation lever 93 is placed in the state where it is rotationally biased in the direction indicated by arrow D in FIG. 21.

When the holder 52 is further moved in the direction indicated by arrow $X_2$ in FIG. 21 to reach the position where contact between one side of the front end side of the fluctuation lever 93 and the rotation limiting piece 100 is released, the fluctuation lever 93 is rotated in the direction indicated by arrow D in FIG. 21 with the spindle 98 being as center to engage the engagement portion 101 provided at one side of the front end side with the pressing operation piece 102 of the holder 52 side. Simultaneously with this engagement, the fluctuation lever 93 releases engagement of the engagement piece 106 with respect to the engagement hole 105 of the chassis 71 side.

The fluctuation lever 93 releases engagement with respect to the chassis 71 side, whereby the fluctuation lever 93 undergoes biasing force of the first extension coil spring 94 so that it is placed in movable state. At this time, since the fluctuation lever 93 engages the engagement portion 101 with the pressing operation piece 102 of the holder 52, the fluctuation lever 93 is placed in the state where it can be moved in one body with the holder 52. At this time, since biasing force which moves the slider 92 in the eject direction of the direction indicated by arrow $X_2$ in FIGS. 20 and 21 is stored at the first extension coil spring 94, the holder 52 is moved in the eject direction of the direction indicated by arrow $X_2$ in FIGS. 20 and 21 through the fluctuation lever 93 moved in one body with the slider 92.

Figure 20:
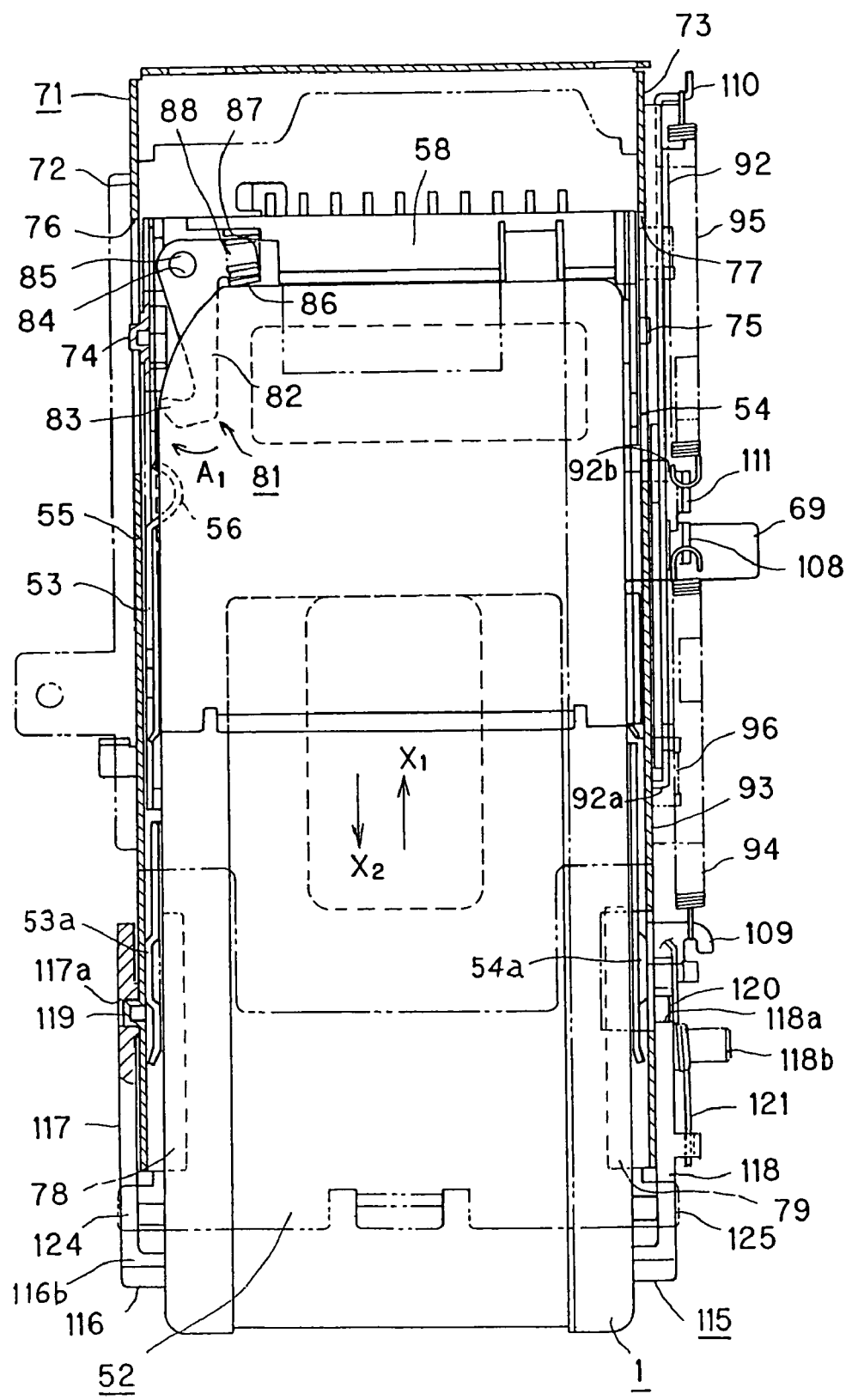
FIG. 20 is a plan view showing the state where memory medium loaded into holder is ejected.

When the holder 52 is moved in the direction indicated by arrow $X_2$ in FIGS. 20 and 21, curved surface 116a of the opening/closing cover 115 is caused to undergo pressing operation by the memory medium 1 held by the holder 52. As a result, the opening/closing cover 115 is rotated against biasing force of the torsion coil spring 121 so that the memory medium insertion/withdrawal portion 112 is opened. Thus, a portion of the memory medium 1 is projected toward the external of the apparatus through the memory medium insertion/withdrawal portion 112. By grasping the portion projected from the memory medium insertion/withdrawal portion 112 to pull the memory medium 1, the contact portion 3 is caused to be away from the connector 58. Thus, eject operation is completed. The opening/closing cover 115 undergoes biasing force of the torsion coil spring 121 along with the eject operation of the memory medium 1 so that it is rotated to close the memory medium insertion/withdrawal portion.

At this time, the holder 52 is moved to the initial position shown in FIG. 8. Thus, the lock lever 82 of the lock mechanism 81 undergoes biasing force of the compression coil spring 88 so that it is moved in the direction indicated by arrow $A_1$ in FIG. 8. As a result, the holder 52 is engaged with the chassis 71 so that it is placed in locked state.

Meanwhile, the engagement piece 106 engaged with the engagement hole 105 of the chassis 71 side provided at the fluctuation lever 93 is provided in the state positioned at the side edge of the front end side in length direction of the fluctuation lever 93. Namely, the engagement piece 106 is provided at the position deviating with respect to center line P1 passing through the spindle 89 serving as fulcrum of rotation of the fluctuation lever 93 and at the position spaced from the spindle 89. Accordingly, when the fluctuation lever 93 is moved and biased in a direction in parallel to center line P1 by the first extension coil spring 94, it comes into contact with the engagement hole 105 from a direction having a predetermined angle. At this time, the fluctuation lever 93 is placed in the state where it is rotationally biased in the direction indicated by arrow D in FIG. 19. Further, contact surface to the engagement hole 105 of the engagement piece 106 is formed in a manner substantially perpendicular to the center line P1, thereby making it possible to easily carry out hoding/withdrawal with respect to the engagement hole 105. Namely, this is because force applied when the fluctuation lever 93 is biased so that the engagement piece 106 comes into contact with the engagement hole 105 is directed to the direction where the fluctuation lever 93 is rotationally biased. Accordingly, it is possible to easily carry out, by small force, eject operation of the memory medium 1 loaded with respect to the holder 52.

While the fluctuation lever 93 which constitutes the loading control mechanism 91 is caused to be of a configuration such that it is supported by the slider 92 and is moved in movement direction of the holder 52 along with the slider 92 in the above-described example, it is not necessarily required that the slider 92 is used. There may be employed a configuration such that the fluctuation lever 93 is moved in relation to movement of the holder 52, and fluctuates with the spindle 98 being as center in accordance with movement position of the holder 52 so that it is engaged with the chassis 71 or the holder 52 to thereby give biasing forces of first and second extension coil springs 94,.95 which produce biasing forces opposite to each other to the holder 52. Namely, the fluctuation lever 93 may be directly supported at the second supporting wall 73 of the chassis 71 so that it can be rotated and can be moved in the movement direction of the holder 52.

INDUSTRIAL APPLICABILITY

As described above, in the present invention, by selective engagement with respect to the chassis or the holder of the fluctuation lever which is moved and fluctuated in relation to movement of the holder adapted so that the memory medium is inserted and held and moved in a manner bridging between the eject position where insertion/withdrawal of the memory medium is permitted and the loading position for the memory medium, the first biasing member which moves and biases the holder in the eject direction opposite to the memory medium insertion direction is caused to store biasing force in the eject direction, and the second biasing member which biases the holder in the memory medium insertion direction is caused to be operative. Accordingly, it is possible to carry out switching between movement in the memory medium insertion direction of the holder and movement in the eject direction only by movement and fluctuation of one fluctuation lever. Thus, the mechanism for controlling loading of the memory medium can become simple, and can become compact.

Further, in the present invention, since the memory medium is caused to undergo insertion operation on one direction, connection to the connector within the recording/reproducing apparatus is realized, and loading with respect to the memory medium loading position can be carried out. Accordingly, it is possible to easily carry out carrying operation of the memory medium.

In addition, in the present invention, movement in the memory medium insertion direction or in the eject direction of the holder is carried out by using biasing member such as extension coil spring, etc. Accordingly, by suitably selecting strength of the biasing member, it is possible to arbitrarily set action force and it is possible to realize stable loading operation and eject operation of the memory medium.

The invention claimed is:

1. A carrying apparatus for a memory medium, comprising:
   a holder adapted to have the memory medium inserted therein including a connection terminal connected to a contact provided at a front end side of the inserted memory medium;
   a lock mechanism provided on the holder and locked with respect to a chassis of the holder so that the holder is movably supported, the lock mechanism serving to limit movement with respect to the chassis of the holder, so that when the contact of the memory medium inserted into the holder is connected to the connection terminal of the holder, the lock mechanism is pressed by the memory medium to thereby release a locking state with respect to the chassis;
   a fluctuation lever engaged with the holder and moved when the lock mechanism is released, the fluctuation lever moved in an insertion direction of the memory medium as one with the holder;
   first biasing means for biasing the fluctuation lever in an eject direction opposite to the insertion direction of the memory medium; and
   second biasing means for biasing the holder in the insertion direction of the memory medium,
   wherein the fluctuation lever is moved in the insertion direction of the memory medium as one with the holder to thereby allow the first biasing means to store a biasing force that moves the fluctuation lever in the eject direction, and engagement with respect to the holder is released by movement in the insertion direction of the memory medium of the fluctuation lever and only the holder into which the memory medium is inserted is drawn in the insertion direction of the memory medium by the second biasing means in accordance with engagement with respect to the chassis.

2. The carrying apparatus for a memory medium as set forth in claim 1, wherein the fluctuation lever is rotationally biased by the first biasing means in a direction where engagement with respect to the holder is released.

3. The carrying apparatus for memory medium as set forth in claim 2, wherein when the fluctuation lever is moved in the insertion direction of the memory medium as one with the holder, release of engagement with respect to the holder is limited by rotation limiting means provided at a side of the chassis that movably supports the holder.

4. The carrying apparatus for a memory medium as set forth in claim 1, wherein the lock mechanism includes a pressing operation portion caused to undergo a pressing operation by a lock piece engaged with the chassis and the memory medium inserted into the holder and a lock lever rotatably supported by the holder and rotationally biased by a biasing member in a direction to engage the lock piece with the chassis.

5. The carrying apparatus for a memory medium as set forth in claim 1, wherein a cover body rotatably attached to the chassis opens and closes a memory medium insertion/withdrawal opening adapted so that the memory medium to be inserted into the holder is inserted thereinto or is withdrawn therefrom, the cover body being rotationally biased in a direction to close the memory medium insertion/withdrawal opening by a biasing member at all times.

6. The carrying apparatus for a memory medium as set forth in claim 1, wherein the apparatus further comprises a slider movably supported by the chassis in the insertion direction with respect to the holder of the memory medium, and adapted so that the fluctuation lever is rotatably supported,
   wherein the first biasing means includes a first biasing member provided in a manner bridging between the slider and the chassis and biases the holder in the eject direction opposite to the insertion direction of the memory medium,
   wherein the second biasing means includes a second biasing member provided in a manner bridging between the slider and the holder and biases the holder in the insertion direction of the memory medium, and
   wherein the fluctuation lever is adapted so that the locking state with respect to the chassis by the lock mechanism is released and is moved in the insertion direction of the memory medium in one body with the holder moved in the insertion direction of the memory medium to allow the first biasing member to store a biasing force that moves the slider in the eject direction, whereby when a fluctuation lever lock mechanism provided at the fluctuation lever is moved to a position opposite to a cut portion provided at the chassis side, the fluctuation lever lock mechanism is inserted into the cut portion and engagement between the engagement portion and the holder is released by a rotational force produced as a result of a force in the insertion direction of the memory medium by the holder and a biasing force in the eject direction by the first biasing member with respect to the fluctuation lever act with respect to an engagement portion of the fluctuation lever formed at a position engaged with the holder, and the fluctuation lever and the slider are locked with respect to the chassis and only the holder into which the memory medium is inserted is drawn in the insertion direction of the memory medium by the biasing force of the second biasing member.

7. The carrying apparatus for a memory medium as set forth in claim 1, wherein the apparatus further comprises eject operation means for causing the holder moved in the insertion direction of the memory medium by the second biasing means to undergo movement operation in the eject direction against a biasing force of the second biasing means, and
   wherein when only the holder into which the memory medium is inserted is drawn in the insertion direction of the memory medium by the second biasing means so that it is held at a loading position of the memory medium, the holder is moved in the eject direction against the biasing force of the second biasing means through the eject operation means to thereby release engagement with respect to the chassis of the fluctuation lever to receive the biasing force of the first biasing means to move the holder in the eject direction as one with the fluctuation lever to move the holder to an initial position.

8. The carrying apparatus for a memory medium as set forth in claim 7, wherein the eject operation means comprises an eject operation piece moved as one with the holder.

9. The carrying apparatus for a memory medium as set forth in claim 7, wherein the apparatus further comprises a slider movably supported by the chassis in the insertion direction with respect to the holder of the memory medium and adapted so that the fluctuation lever is rotatably supported, wherein the first biasing means includes a first biasing member provided in a manner bridging between the slider and the chassis for biasing the slider in the eject direction opposite to the insertion direction of the memory medium, wherein the second biasing means includes a second biasing member provided in a manner bridging between the slider and the holder for biasing the holder in the insertion direction of the memory medium, wherein the fluctuation lever is adapted so that the locking state with respect to the chassis by the lock mechanism is released and the fluctuation lever is moved in the insertion direction of the memory medium as one with the holder moved in the insertion direction of the memory medium to thereby allow the first biasing member to store the biasing force that moves the slider in the eject direction, and when a fluctuation lever lock mechanism provided at the fluctuation lever is moved to a position opposite to a cut portion provided at the chassis side, the fluctuation lever lock mechanism is inserted into the cut portion and engagement between the engagement portion and the holder is released by a rotational force produced as a result of a force in the insertion direction of the memory medium by the holder and the biasing force in the eject direction by the first biasing member with respect to the fluctuation lever act with respect to engagement portion of the fluctuation lever formed ay a position engaged with the holder, and the fluctuation lever and the slider are locked with respect to the chassis and only the holder into which the memory medium is inserted is drawn in the insertion direction of the memory medium by a biasing force of the second biasing means, and wherein the holder is moved in the eject direction against the biasing force of the second biasing member through the eject operation means, and the fluctuation lever is rotated by the biasing force by the first biasing member to release the locking state with respect to the chassis by the fluctuation lever lock mechanism to receive the biasing force of the first biasing member to move the holder in the eject direction as one with the fluctuation lever to move the holder to an initial position.

10. A recording and/or reproducing apparatus, comprising:

a holder adapted to have a memory medium inserted therein including a connection terminal connected to a contact provided at a front end side of the inserted memory medium;

recording and/or reproducing means for carrying out recording and/or reproduction of data with respect to the memory medium having the contact connected to the connection terminal of the holder;

a lock mechanism provided on the holder and locked by a chassis of the holder adapted so that the holder is movably supported, the lock mechanism serving to limit movement with respect to the chassis of the holder, so that when the contact of the memory medium inserted into the holder is connected to the connection terminal of the holder, the lock mechanism is pressed by the memory medium to thereby release a locking state with respect to the chassis;

a fluctuation lever engaged with the holder and moved when the lock mechanism is released in an insertion direction of the memory medium as one with the holder;

first biasing means for biasing the fluctuation lever in an eject direction opposite to the insertion direction of the memory medium; and second biasing means for biasing the holder in the insertion direction of the memory medium, wherein the fluctuation lever is moved in the insertion direction of the memory medium as one with the holder to thereby allow the first a biasing means to store biasing force that moves the fluctuation lever in the eject direction, and engagement with respect to the holder is released by movement in the insertion direction of the memory medium of the fluctuation lever and only the holder into which the memory medium is inserted is drawn in the insertion direction of the memory medium by the second biasing means in accordance with engagement with respect to the chassis.

11. The recording and/or reproducing apparatus as set forth in claim 10, wherein the recording and/or reproducing means carries out recording and/or reproduction of data with respect to the memory medium when the contact is connected to the connection terminal of the holder at a reproduction position where the memory medium is located as a inserted is drawn in the insertion direction of the memory medium by the second biasing means.

12. A carrying method for a memory medium comprising:

a step of inserting a memory medium into a holder;

a step of electrically connecting a contact of the memory medium and a connection terminal within the holder;

a step of pressing lock means that locks the holder with respect to a chassis of the holder by the memory means after the contact of the memory medium and the connection terminal within the holder have been electrically connected to thereby release a locking state by the lock means;

a step of further moving the holder in an insertion direction along with the memory medium;

a step of engaging a lever moved in the insertion direction as one with the holder as a result of the lever being engaged with the holder, and of releasing engagement with respect to the holder;

a step of storing a biasing force in an eject direction of the memory medium opposite to the insertion direction at first biasing means for a time period during which the lever is moved in the insertion direction where engagement with the holder is released; and a step of drawing only the holder in which engagement by the lever has been released in the insertion direction along with the memory medium by second biasing means.

13. The carrying method for memory medium as set forth in claim 12, wherein the method further comprises:

a step of drawing only the holder in which engagement by the lever has been released in the insertion direction along with the memory medium by the second biasing means to hold the holder at a loading position; and a step of moving the holder held at the loading position in the eject direction against a biasing force of the second biasing means to thereby release engagement with respect to the chassis of the fluctuation lever to receive a biasing force of the first biasing means to move the holder in the eject direction as one with the lever to move the holder to an initial position.

* * * * *

UNITED STATES PATENT AND TRADEMARK OFFICE
CERTIFICATE OF CORRECTION

PATENT NO. : 7,125,271 B2  Page 1 of 1
APPLICATION NO. : 10/399003
DATED : October 24, 2006
INVENTOR(S) : Hisashi Hanzawa and Taizo Ogawa It is certified that error appears in the above-identified patent and that said Letters Patent is hereby corrected as shown below:

In the Abstract, Line 11, insert --and-- before "is";
In Column 2, Line 25, delete ",";
In Column 2, Line 30, delete "–";
In Column 3, Line 4, delete "-";
In Column 3, Line 22, "median" should read --medium--;
In Column 3, Line 30, delete "-";
In Column 3, Line 52, delete "-";
In Column 6, Line 7, "mega byte" should read --megabytes--;
In Column 6, Line 60, "Stored" should read --stored--;
In Column 6, Line 66, "parallelepiped" should read -- parallel-piped--;
In Column 7, Line 5, "median" should read --medium--;
In Column 7, Line 14, "are" should read --is--;
In Column 7, Line 16, "With" should read --with--;
In Column 7, Line 18, "Stored" should read --stored--;
In Column 9, Line 10, "12" should read --21--;
In Column 10, Line 62, delete "." before "58";
In Column 10, Line 64, "houding" should read -- housing--;
In Column 11, Line 7, "hole" should read --holes--;
In Column 11, Line 12, "supports" should read --support--;
In Column 11, Line 33, "first-and" should read --first and--;
In Column 12, Line 20, delete "." after "arrow";
In Column 12, Line 28, "streatched" should read --stretched--;
In Column 13, Line 11, "hold" should read --hole--;
In Column 13, Line 51, "opens or closes" should read --open or close--;
In Column 13, Line 60, "axis" should read --arms--;

Signed and Sealed this

Eighteenth Day of September, 2007

JON W. DUDAS
*Director of the United States Patent and Trademark Office*